United States Patent
Sogabe et al.

(10) Patent No.: US 6,349,119 B1
(45) Date of Patent: Feb. 19, 2002

(54) TRANSMISSION LINE PRESUMING CIRCUIT AND MODEM USING THE SAME

(75) Inventors: Yasushi Sogabe; Masanori Akiyoshi, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/077,749

(22) PCT Filed: Nov. 22, 1996

(86) PCT No.: PCT/JP96/03443

§ 371 Date: Jun. 11, 1998

§ 102(e) Date: Jun. 11, 1998

(87) PCT Pub. No.: WO98/23043

PCT Pub. Date: May 28, 1998

(51) Int. Cl.[7] ............................................... H04L 27/06
(52) U.S. Cl. ...................................................... 375/316
(58) Field of Search ................................ 375/316, 377, 375/329, 260, 347, 380, 340; 342/357.01, 357.06

(56) References Cited

U.S. PATENT DOCUMENTS 5,274,382 A   12/1993   Wills et al. .................. 342/359
5,889,825 A *  3/1999   Schreib ....................... 375/347

FOREIGN PATENT DOCUMENTS

| EP | 0421698 A2 | 4/1991 |
| EP | 0444738 A2 | 9/1991 |
| JP | 5399816 | 8/1978 |
| JP | 2305035 | 12/1990 |
| JP | 787011 | 3/1995 |
| JP | 8149041 | 6/1996 |
| WO | WO98/01768 A1 | 1/1998 |

OTHER PUBLICATIONS

"A Technical Trend of High–Speed Wireless LANs Wireless Enterprise Systems, Nippon Motorola Ltd."; The 6th Karuizawa Workshop on Circuits and Systems; Apr. 19–20, 1993; pp. 66–69.

* cited by examiner

*Primary Examiner*—Tesfaldet Bocure

(57) ABSTRACT

A channel between a radio terminal (141) of the transmitting side and a radio terminal of the receiving side is geometrically modeled, then the thus obtained channel model is used to recognize the position of a transmitting antenna (151) of a distant station, and a path is estimated from the result of recognition to select a channel in better condition for high-quality communication. Geometrical information on the surrounding conditions is taken in by a geometrical information input device (11) such as a vehicle-mounted camera (120), and a geometrical information recognition device (12) searches the geometrical information for the transmitting antenna (151) of the distant station and outputs position information of the transmitting antenna. And a model generating device (13) generates the channel model based on the geometrical information provided from the geometrical information input device and the antenna position information from the geometrical information recognition device (12).

4 Claims, 22 Drawing Sheets

|  UM\CM | 1 | 2 | 3 | 4 | 5 | 6 |
|---|---|---|---|---|---|---|
| 1 |  |  |  |  |  |  |
| 2 |  | Bad |  |  |  |  |
| 3 |  |  |  |  |  |  |
| 4 |  | Better |  |  |  |  |
| 5 |  |  |  |  | Good |  |
| 6 |  |  |  |  | Better |  |

(UM ANTENNA NO. across top; CM ANTENNA NO. down side)

FIG.16
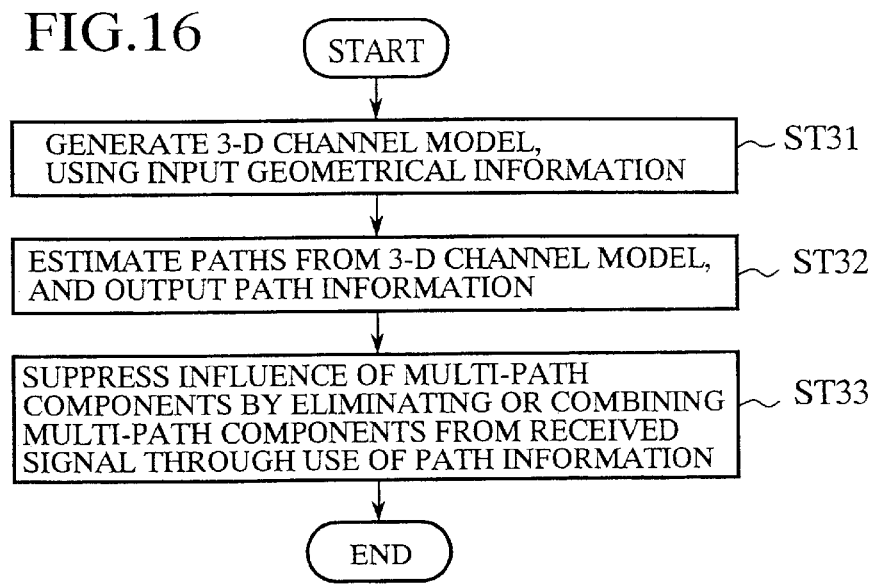
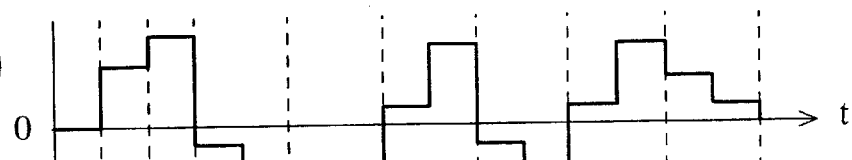
FIG.17(a)
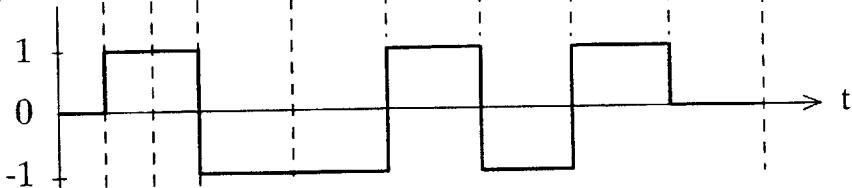
FIG.17(b)
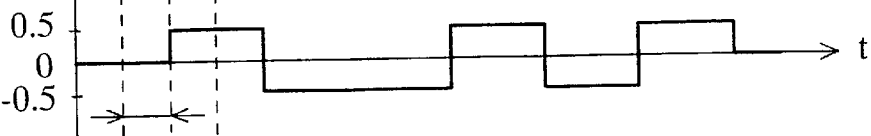
FIG.17(c)
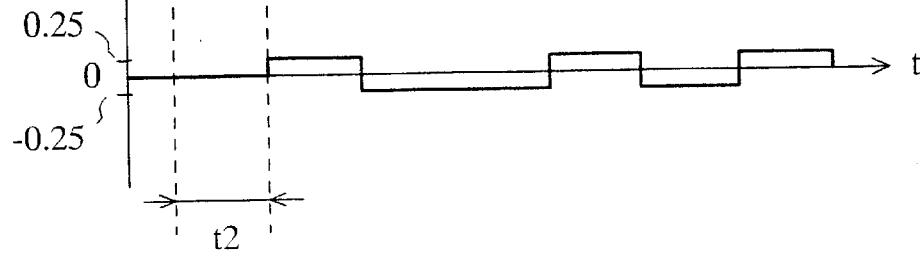
FIG.17(d)

TRANSMISSION LINE PRESUMING CIRCUIT AND MODEM USING THE SAME

This application is the national phase under 35 U.S.C. §371 of prior PCT International Application No., PCT/JP96/03443, which has an International filing date of Nov. 22, 1996, which designated the United States of America, the entire contents of which are hereby incorporated by reference.

TECHNICAL FIELD

The present invention relates to a channel estimation circuit for estimating the conditions of a channel through the use of a modeled channel prior to communication and to a modem having such a channel estimation circuit for use in a mobile communication system or mobile satellite communication system.

BACKGROUND ART

As a system for estimating the conditions of channels, there has been proposed a system that uses a six-beam antenna for each of transmission and reception and chooses the best route from a total of thirty-six channels.

An example of such conventional channel estimation systems there is illustrated in FIGS. 1 and 2, which are simplified versions of the figures presented in an article entitled "A Technical Trend of High-speed Wireless Lans" (Tsutsumi et al.), 6th Karuizawa Workshop on Circuit and System (1993). In FIG. 1, reference numeral 1 denotes a radio terminal called a user module (hereinafter referred to as UM) mounted on a table or the like, 2 a radio terminal which is called a control module (hereinafter referred to as CM) mounted on a ceiling of a room, for example, and connected with plural user modules UM1 by radio, and 3 schematically depicted walls of a room. Solid lines in FIG. 1 represent possible channels between CM2 and UM1. Terms "Good", "Better", and "Bad" in cells shown in FIG. 2 imply that the channels associated with the cells have "Good", "Ordinary", and "Bad" communication conditions, respectively. Void cells imply that the corresponding channels are not available for the current communication.

As shown in FIG. 1, CM2 and UM1 each have a six beam antenna, so that a total of thirty-six channels are available between CM2 and UM1. CM2 and UM1 are always aware of individual transmission qualities of the thirty-six channels in such a tabular form as depicted in FIG. 2, and may select the best one for use when the communication is actually performed.

The operation will now be described below.

It is supposed that CM2 and UM1 are arranged in a room surrounded by the walls 3 and that the channels between UM1 and CM2 at a given moment have such transmission qualities as shown in FIG. 1. At this time, only four channels are presented as indicated by the solid lines in FIG. 1. If the best channel is searched in the four channels, there is one way from the fifth antenna of CM2 to the sixth antenna of UM1. Thus, the channel from the fifth antenna of CM2 to the sixth antenna of UM1 will be selected when the communication is actually started.

Because the conventional channel estimation systems have such a configuration as described above, they use received signals to estimate the qualities of the channel and determine the channel for the current burst through utilization of a signal of the immediately preceding burst, whereby this gives rise to a problem that the system cannot follow quick changes on transmission quality.

In addition, such a conventional system needs continual monitoring of transmission qualities of the channel, and the transmission and reception it is performed between CM2 and UM1, also there is a problem that the efficiency in lines is lowered.

Further, the conventional channel estimation systems normally presume communication between fixed stations, and no consideration is given to a system which involves frequent channel switching by a radio terminal like UM1 during communication, with the radio terminal being moved.

The present invention is intended to overcome the above-mentioned problems, and has for its object to provide a channel estimation circuit capable of estimating the conditions of channels between a transmitter and a receiver with higher accuracy by obtaining models of the channel in geometrical form, then recognizing the position of the transmitting antenna through utilization of geometrical information based on the models, and estimating the path between the transmitter and the receiver.

It is another object to provide a channel estimation circuit that improves the transmission efficiency by geometrically estimating the path between the transmitter and the receiver.

It is a further object to provide a modem that permits high quality communication by following the path between the transmitter and the receiver through the use of geometrically modeled channels.

It is still a further object to provide a modem that permits fast channel switching by a terminal while moving during communication.

DISCLOSURE OF THE INVENTION

A channel estimation circuit according to the invention defined in claim 1 is one that first takes in geometrically ambient conditions by a geometrical data input device, then searches the input geometrical information for position information on the antenna of a distant station by a geometrical information recognition device, and geometrically formulates models of channels between radio terminals of the local station and the distant station by a modeling device through utilization of the searched-out position information on the antenna and the input geometrical information.

Therefore, it is possible to search for the antenna of the distant station with higher accuracy from its geometrically estimated position and estimate channel conditions with higher accuracy by using the channel models formulated from the input geometrical information, thereby eliminating the need for monitoring the transmission performance of every channel at all time and hence providing for increased line efficiency.

A channel estimation circuit according to the invention defined in claim 2 is one that is adapted to limit the range over which to search for the position of the antenna of the distant station through the use of information from an auxiliary geometrical information recognition device when the antenna position and surrounding buildings affecting the channels between the radio terminals of the local and distant stations are known at the time of geometrically formulating models of the channels.

Thus, it is possible to produce an effect of speeding up the search for the antenna of the distant station through the use of the information provided by the auxiliary geometrical information recognition device, in addition to the merit of the invention defined in claim 1.

A modem according to the invention defined in claim 3 is one that geometrically estimates the position of the antenna of the distant station by the use of the channel estimation circuit of claim 1, and enables the antenna of the local station to shift its directivity toward the antenna of the distant station.

Accordingly, the position of the antenna of the distant station can be estimated geometrically with accuracy and hence direct waves can be received with higher accuracy, therefore, it is possible to remove a multi-path component, thus producing an effect of achieving higher quality communication.

A modem according to the invention defined in claim 4 is one that formulates models of channels through the use of the channel estimation circuit of claim 1, estimates paths between radio terminals of the local and distant stations by a path estimating device based on the channel models, selects an optimal one of the estimated paths, and controls the antenna of the local station to shift its directivity toward the selected path.

Therefore, it is possible to produce the same effects as those obtainable with the invention of claim 3, and further, since the modem uses an optimal path based on the channel models for communication, high quality communication can be maintained even if the direct wave is blocked by an obstacle or even if sudden channel switching occurs.

A modem according to the invention defined in claim 5 is one that formulates models of channels through the use of the channel estimation circuit of claim 1, and eliminates or synthesizes multi-path components from received signals by a demodulator based on the channel models obtained with the channel estimation circuit.

Therefore, it is possible to lessen the influence of the multi-path component and hence bring about an effect of achieving high quality communication even if a non-directional antenna is used as the receiving antenna.

A modem according to the invention defined in claim 6 is one that formulates models of channels through the use of the channel estimation circuit of claim 1, always estimates by a frequency deviation calculating circuit, through utilization of the modeled channels, a frequency deviation due to a Doppler shift anticipated to occur following channel switching, and, when the channel switching actually occurs, provides the estimated frequency deviation as frequency information to the demodulator, which uses the frequency information to eliminate the frequency deviation due to the Doppler shift.

Therefore, it is possible to eliminate the frequency deviation due to the Doppler shift at the time of channel switching and hence produce an effect of achieving a quick initial pull-in operation.

A modem according to the invention defined in claim 7 is one that utilizes, in any one of the modems as defined in claims 3, 4, and 5, the frequency deviation calculating circuit mentioned in claim 6 to continually estimate a frequency deviation anticipated to occur due to the Doppler shift at the time of channel switching, and eliminates the frequency deviation due to the Doppler shift based on the estimated frequency deviation upon occurrence of channel switching.

Therefore, it is possible to produce the same effects as those obtainable with the inventions of f claims 3 through 5 and an effect of allowing a quick initial pull-in operation as is the case with the invention defined in claim 6.

A modem according to the invention defined in claim 8 is one that substitutes the channel estimation circuit of claim 7 with the channel estimation circuit of claim 2 adapted to limit the range over which to search for the antenna of the distant station through the use of information received from the auxiliary geometrical information recognition device when geometrically formulating models of channels between the radio terminals of the local and distant stations.

Therefore, it is possible to produce an effect of speeding up the search for the antenna of the distant station, in addition to the same effect as is obtainable with the invention of claim 7.

A modem according to the invention defined in claim 9 is one that formulates models of channels between the radio terminals of the local and distant stations through the use of the channel estimation circuit defined in claim 1, then estimates the path between the radio terminals of the both stations based on the channel models obtained with the channel estimation circuit and determines by a decision circuit whether an equalizer is needed or not according to the results of estimation, and provides a control signal to the equalizer to put it in or out of operation, depending on whether it is needed or not.

Therefore, it is possible to decide the ON/OFF control of the equalizer based on ambient conditions, permitting reduction of power consumption of the modem by stopping unnecessary operation of the equalizer.

A modem according to the invention defined in claim 10 is one that formulates channel models through the use of the channel estimation circuit of claim 1, then diagnoses by a channel diagnosing circuit the conditions of channels between the transmitter and the receiver based on the channels obtained with the channel estimation circuit, and determine the transmission rate in accordance with the results of diagnosis.

Therefore, it is possible to perform communication at the transmission rate corresponding to the results of diagnosis of the channels between the transmitter and the receiver, bringing about an effect of permitting communication at more optimum transmission rate.

A modem according to the invention defined in claim 11 is one that estimates the path between radio terminals of the local and distant stations by a path estimating device based on the channel models obtained with the channel estimation circuit of claim 1 as in the invention of claim 4, and controls transmission by a transmission control part through utilization of the path information from the path estimating device so as to lessen the influence of the multi-path components at the receiving side.

Therefore, since transmission is controlled at the transmitting side to lessen the influence of the multi-path components at the receiving side, no equalizer is needed and no multi-path components are received at the receiving side, whereby this permits high quality communication even if a non-directional antenna is used at the receiving side.

A modem according to the invention defined in claim 12 is one that formulates models of channels through the use of the channel estimation circuit of claim 1, always estimates by a frequency deviation calculating circuit through utilization of the channel models a frequency deviation due to the Doppler shift anticipated to occur at the time of channel switching, then provides the estimated frequency deviation as frequency information to a modulator upon occurrence of channel switching, and controls the transmission frequency by the modulator based on the frequency information so as to eliminate the frequency deviation due to the Doppler shift.

Therefore, since the frequency deviation due to Doppler shift can be eliminated in the modulator side at the time of channel switching, the frequency deviation need not be taken into account at the receiving side during channel switching, permitting faster initial pull-in operation.

A modem according to the invention defined in claim 13 is one that substitutes the channel estimation circuit of any one of claims 3 through 6 and 9 through 12 with the channel estimation circuit of claim 2 adapted to limit the range over which to search for the antenna of the distant station through the use of information received from the auxiliary geometrical information recognition device when geometrically formulating models of channels between the radio terminals of the local and distant stations.

Therefore, it is possible to produce an effect of speeding up the search for the antenna of the distant station, in addition to the same effect as is obtainable with the invention of any one of claims 3 through 6 and 9 through 12.

BRIEF DESCRIPTION OF THE DRAWINGS

FIG. 16 is a flowchart showing the operation of the demodulation part in Embodiment 5 of the present invention.

FIG. 17 is a timing chart showing temporal relationships between received signals and estimated direct and reflected wave components in Embodiment 5 of the present invention.

BEST MODE FOR CARRYING OUT THE INVENTION

The present invention will now be described in detail by way of example in the best mode contemplated for carrying out the invention, with reference to the accompanying drawings.

EMBODIMENT 1

Figures 1, 2:
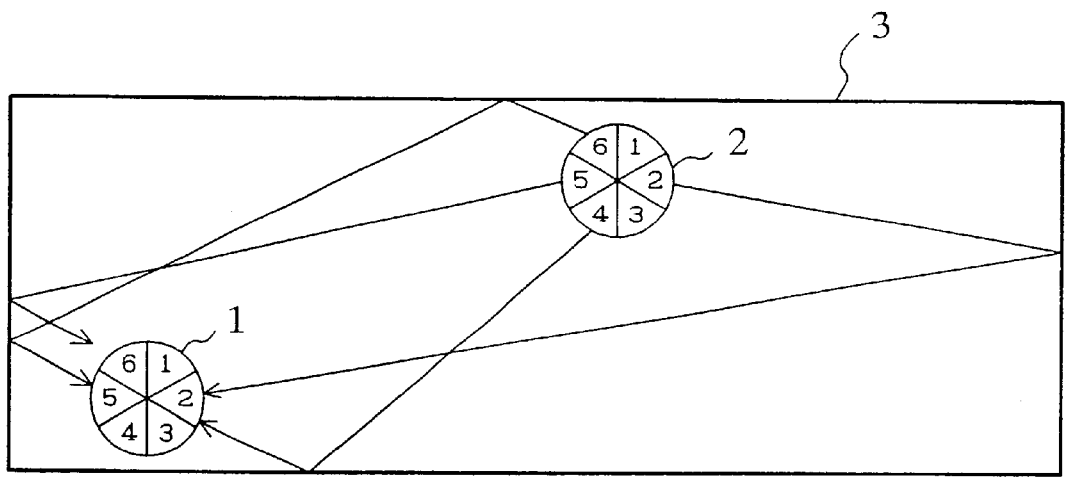
FIG. 1 is a diagram for explaining a conventional channel estimation system.
FIG. 2 is a diagram showing, in a tabular form, transmission qualities of respective channels by the conventional channel estimation.
Figure 3:
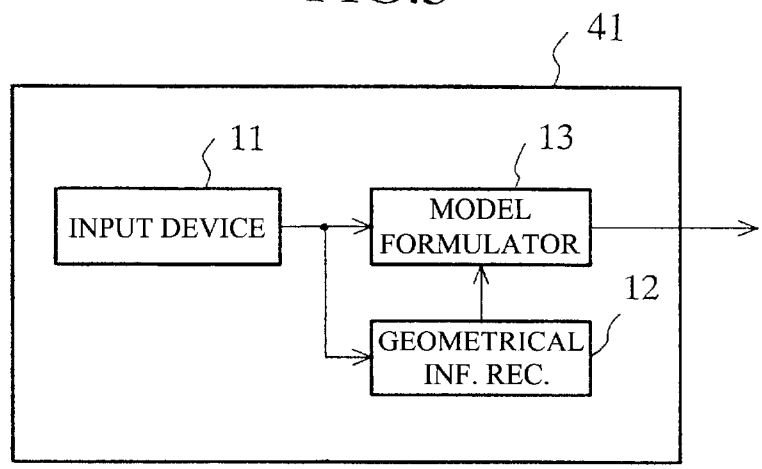
FIG. 3 is a diagram showing the block configuration of a channel estimation circuit according to Embodiment 1 of the present invention.

FIG. 3 shows in block form a channel estimation circuit according to Embodiment 1 of the present invention. In the figure, reference numeral 11 indicates a geometrical information input device for geometrically inputting ambient conditions, such as a camera; reference numeral 12 indicates a geometrical information recognition device that searching the geometrical information from geometrical information input device 11 for a transmitting antenna of a distant station, and outputs position information indicative of the transmitting antenna. Reference numeral 13 denotes a model formulating device for generating a channel model from the geometrical information input by the geometrical information input device 11 and the position information provided from the geometrical information recognition device 12. Reference numeral 41 denotes a channel estimation circuit constituted by the geometrical information input device 11, the geometrical information recognition device 12 and the model formulating device 13.

Figure 4:
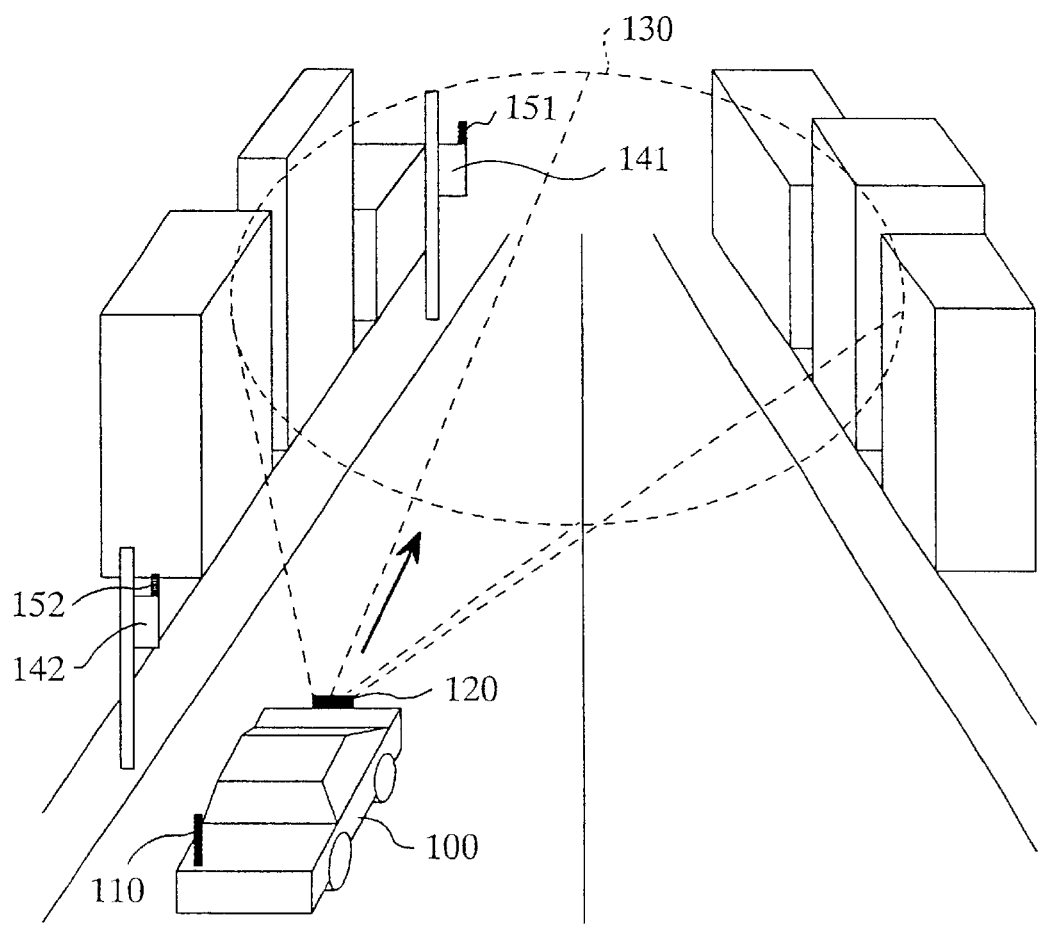
FIG. 4 is a diagrammatic representation of a system utilizing the channel estimation circuit according to Embodiment 1 of the present invention.

In addition, FIG. 4 is a diagrammatic showing of a channel estimation system that uses the channel estimation circuit 41. In the figure, reference numeral 100 denotes a vehicle driving on a street in town, and 110 denotes an antenna of a radio terminal of a local station that is installed in the vehicle 100 but does not appear in the figure (hereinafter referred to as a vehicle-mounted antenna). Reference numeral 120 denotes a camera mounted on the vehicle 100 as the geometrical information input device 11, for taking pictures of the town where the vehicle is driving and for geometrically inputting information about conditions of the town; and 130 denotes the image sensing scope of the vehicle-mounted camera 120. Reference numerals 141 and 142 denote base stations mounted, as radio terminals of distant stations, on street poles in the town; and 151 and 152 denote pole-mounted antennas of the base station 141 or 142 that will be searched for as transmitting antennas by the geometrical information recognition device 12.

The operation will be described below.

Figure 5:
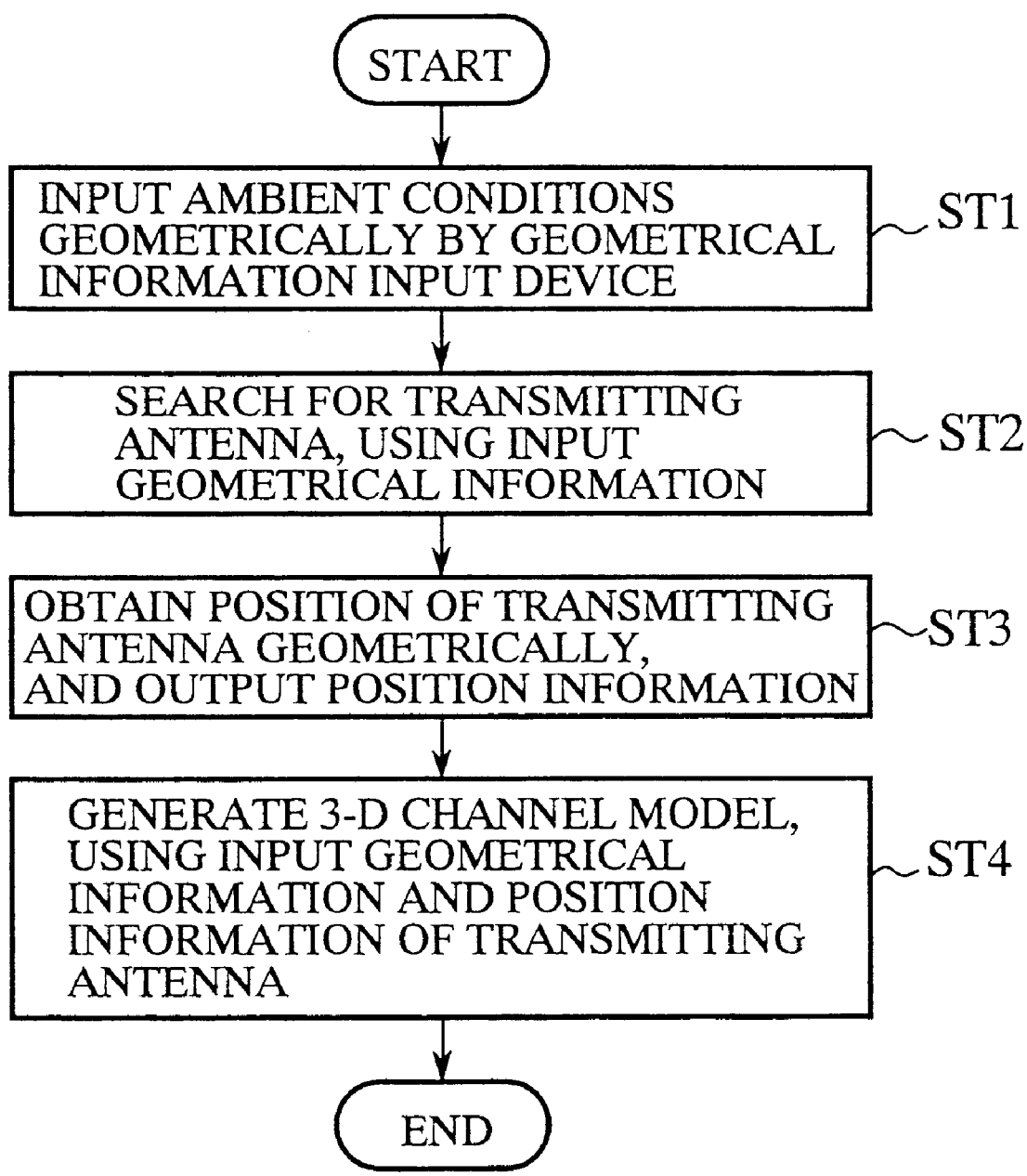
FIG. 5 is a flowchart showing the operation of the channel estimation circuit according to Embodiment 1 of the present invention.

Now there is considered a case where the vehicle 100 equipped with the radio terminal is driving down on the town road in a direction indicated by the arrow in FIG. 4 and where the condition of the channel between the vehicle-mounted antenna 110 and the pole-mounted antenna 151 is estimated prior to starting communication with the base station 141 through the use of the radio terminal installed in the vehicle 100. FIG. 5 is a flowchart of the operation that the channel estimation circuit 41 shown in FIG. 3 performs at that time.

Figure 6:
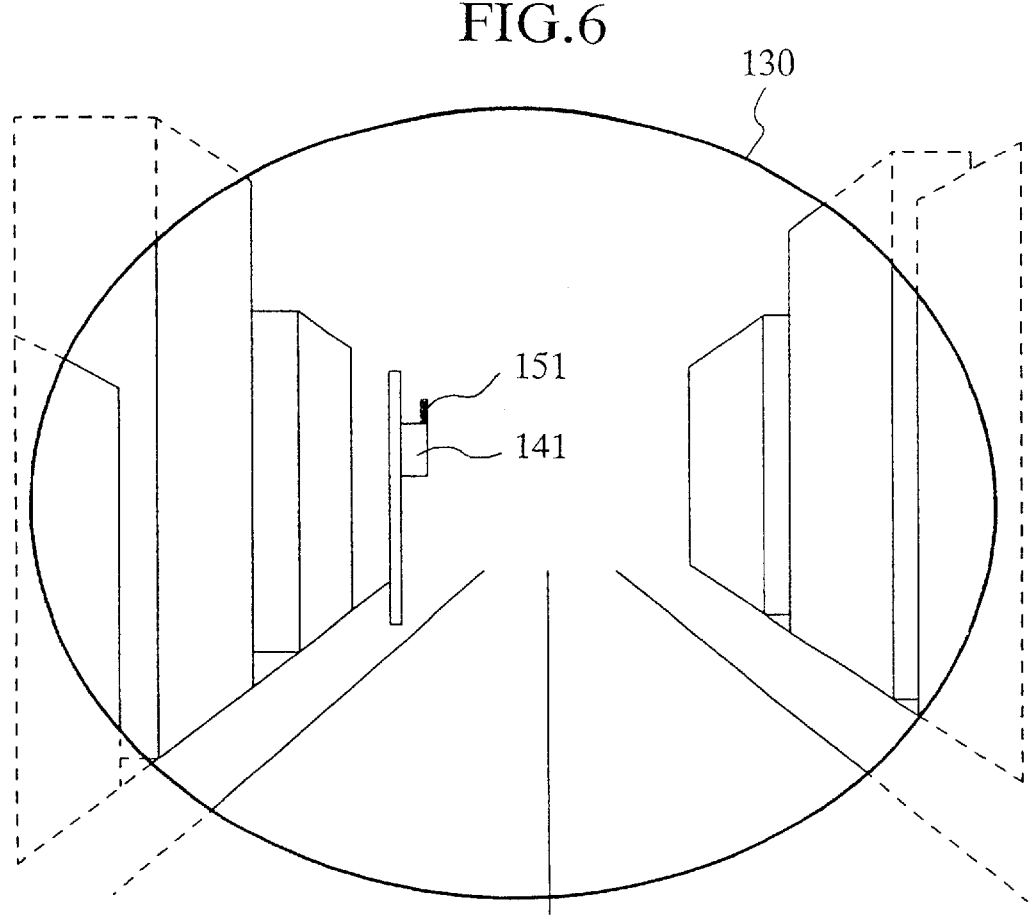
FIG. 6 is a diagram showing an example of geometrical information taken in by a geometrical information input device in Embodiment 1 of the present invention.

The operation starts with step ST1 in FIG. 5, in which the channel estimation circuit takes in geometrical information about the geographic setting of the town ahead of the traveling vehicle 100 obtained by the geometrical information input device 11 (the vehicle-mounted camera 120) mounted on the front of the vehicle 100 as depicted in FIG. 4. FIG. 6 shows an example of the geometrical information obtained by the geometrical information input device 11. As depicted, an image in an image-sensing scope 130 of the vehicle-mounted camera 120, indicated by an oval figure, is taken in as the geometrical information.

Next, in step ST2, the geometrical information recognition device 12 searches the geometrical information from the geometrical information input device 11, depicted in FIG. 6, for the transmitting antenna (the pole-mounted antenna 151) by means of geometrical information recognition such as pattern recognition. The recognition of the transmitting antenna is followed by step ST3, in which its positional relationship to the receiving antenna (the vehicle-mounted antenna 110) is calculated geometrically and positional information on the transmitting antenna is provided to the model formulating device 13. For three-dimensional calculation of the positional relationship of the receiving antenna to the transmitting antenna, it is possible to employ an auto-focus mechanism of the vehicle-mounted camera 120, for instance.

Next, in step ST4, the model formulating device 13 formulates a 3-D channel model as a channel model based on the geometrical information taken in by the geometrical information input device 11. Incidentally, transmission models in the following description are all 3-D models. In this case, the creation of the 3-D model by the model formulating device 13 requires distance information as well as the input geometrical information, but distance information on each building or moving object can also be obtained by the auto-focus mechanism of the vehicle-mounted camera 120, for instance.

This 3-D channel model from the channel estimation circuit 41 is used to estimate the channel between the antennas of the transmitter and the receiver.

In this instance, information available from the 3-D transmission model provided by the channel estimation circuit 41 is, for example, position information (such as distances, heights, and directions) on desired transmitting antennas (the pole-mounted antennas 151 and 152), possible communication paths taking nearby buildings into account, delay times and phases in each of the communication paths. For communication between mobile stations on vehicles, the speeds and the directions of the vehicles are also available in addition to the information mentioned above.

As described above, according to Embodiment 1, the geometrical estimation of the position of a desired transmitting antenna enables an accurate search for the antenna of the counterpart station, and the creation of the channel model from the input geometrical information permits more accurate estimation of the channel conditions, eliminating the need for monitoring the transmission performance of the channel and hence bringing about an effect of increasing the line efficiency.

In the above description, although a 3-D channel model has been shown to be constructed in real time, by performing rotational, enlarging and contracting operations on a 3-D channel model once produced, it is possible to avoid the necessity for producing the 3-d model every time information is input from the geometrical information input device 11, whereby this permits reduction of the overall computational complexity. As regards newly added object information and distance information from the geometrical information input device, however, they are added to the existing 3-D channel model upon each input of them.

While in the above the vehicle-mounted camera 120 has been described to be used as the geometrical information input device 11, it is needless to say that the camera may be substituted with an infrared camera, radar, sonar or the like since the geometrical information input device 11 is information collecting means for generating the 3-D channel model.

EMBODIMENT 2

Figure 7:
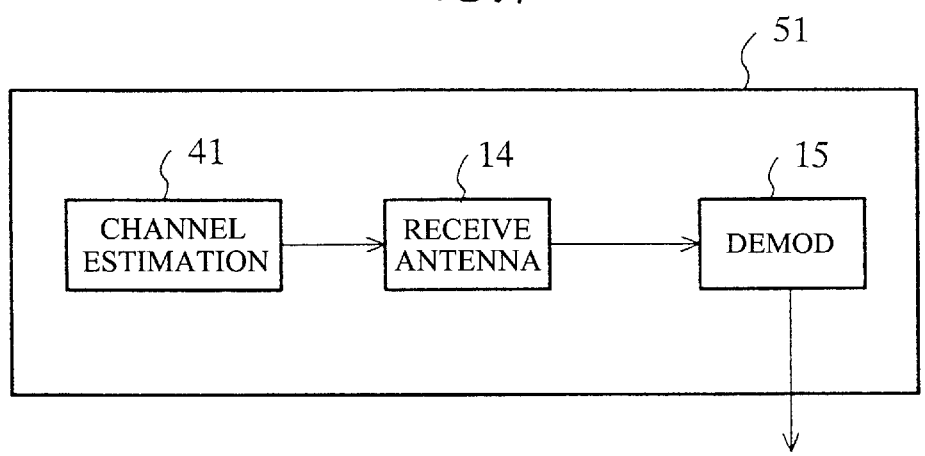
FIG. 7 is a block diagram showing a demodulation part of a modem according to Embodiment 2 of the present invention.

FIG. 7 is a diagram showing the block configuration of the demodulation part of a modem according to Embodiment 2 of the present invention. The demodulation part is formed using a channel estimation circuit of the same configuration as that described above in Embodiment 1. In this figure, reference numeral 41 indicates the channel estimation circuit, and reference numeral 14 indicates a receiving antenna capable of changing its directivity based on the 3-D channel model provided by the channel estimation circuit 41. Reference numeral 15 indicates a demodulator which demodulates signals received by the receiving antenna 14 and outputs the demodulated result as demodulated data. Reference numeral 51 denotes the demodulation part constituted by the channel estimation circuit 41, the receiving antenna 14 and the demodulator 15.

Figure 8:
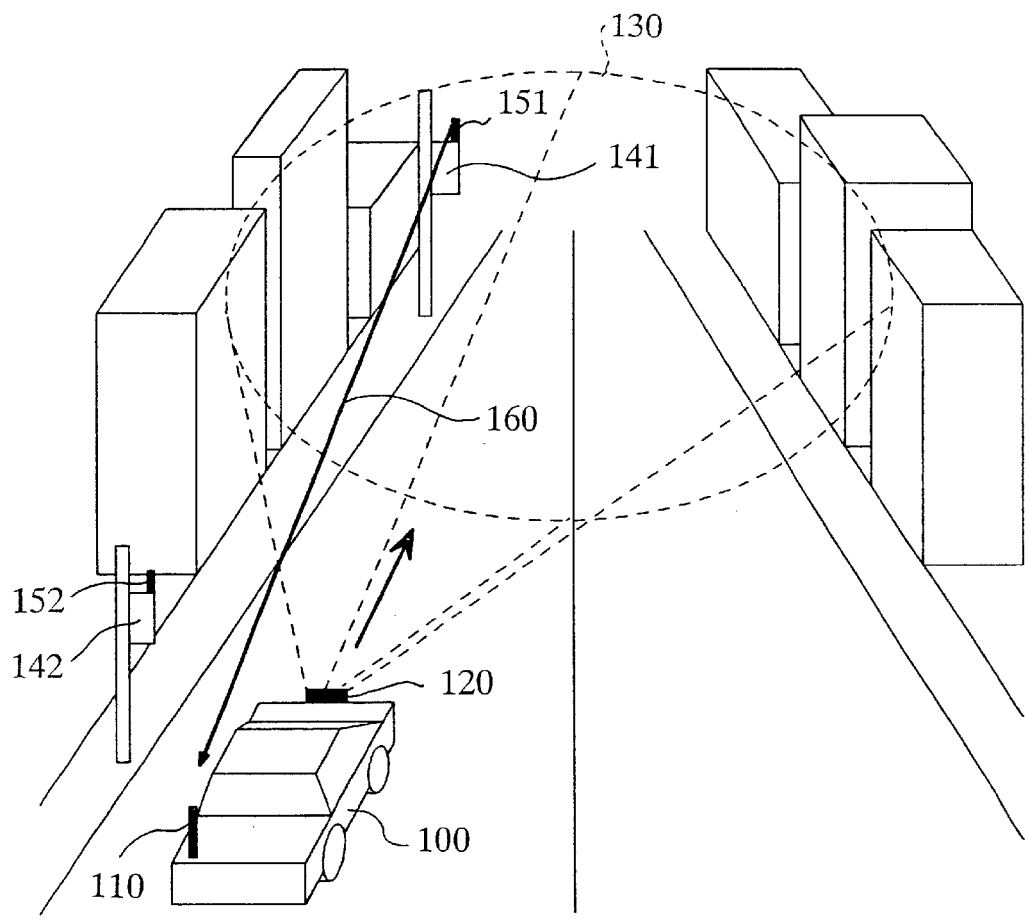
FIG. 8 is a diagrammatic representation of a system utilizing a demodulation part in Embodiment 2 of the present invention.

FIG. 8 is a pictorial view of the channel estimation system utilizing a modem having the above described demodulation part 51. In the figure, reference numeral 100 denotes a vehicle, 110 a vehicle-mounted antenna, 120 a vehicle-mounted camera, 130 the image-sensing scope of the vehicle-mounted camera 120, 141 and 142 base stations, and 151 and 152 pole-mounted antennas, and these elements corresponds to those indicated by the like reference numerals in FIG. 4 described in connection with Embodiment 1. The vehicle-mounted antenna 110 serves as the aforementioned receiving antenna 14 that changes it directivity in response to the information provided from the channel estimation circuit 41. Reference numeral 160 indicates a direct wave from the pole-mounted antenna 151 that is received directly by the vehicle-mounted antenna 110 without any reflection by buildings.

The operation will be described below.

Figure 9:
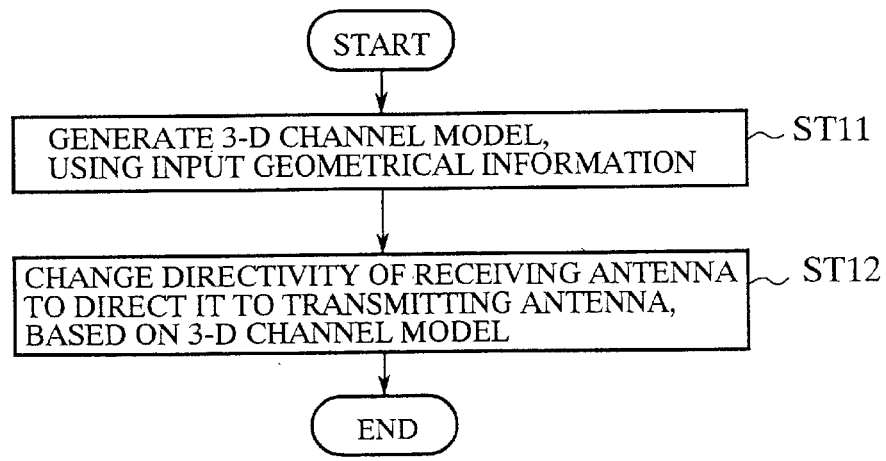
FIG. 9 is a flowchart showing the operation of the demodulation part in Embodiment 2 of the present invention.

Now, there is considered a situation where the vehicle 100 equipped with a radio terminal is driving down a town road in the direction indicated by the arrow as shown in FIG. 8 and where a signal from the base station 141 is received by the radio terminal mounted on the vehicle 100. FIG. 9 is a flowchart of the operation of demodulation part 51 shown in FIG. 7 at that time.

In step ST11, as is the case with Embodiment 1, the channel estimation circuit 41 takes in geometrical information on the scenery ahead of the vehicle 100 by the camera 120 mounted on the front thereof as depicted in FIG. 8, and produces a 3-D model of the channel between the transmitter and the receiver. Next, in the step ST12, the channel estimation circuit 41 uses the 3-D channel model to provide the position information of the transmitting antenna (the pole-mounted antenna 151) to the receiving antenna 14 (that is, the vehicle-mounted antenna 110) connected to the stage next thereto, and the receiving antenna 14 changes its directivity towards the transmitting antenna, based on the position information of the transmitting antenna received from the channel estimation circuit 41.

Thereafter, by repeating this process, the receiving antenna 14 can be controlled in real time to hold its directivity towards the transmitting antenna all the time to receive the direct wave 160 securely.

As described above, according to Embodiment 2, the geometrical estimation of the position of the distant station enables reception of the direct wave 160 with higher accuracy, and hence permits elimination of the multi-path component, producing an effect of ensuring communication with higher quality.

EMBODIMENT 3

While in Embodiment 2 the position information of the transmitting antenna has been described to be directly fed from the channel estimation circuit 41 to the receiving antenna 14 to control its directivity, it is also possible to control the directivity of the receiving antenna 14 based on the result of an estimation of a path between the transmitter and the receiver which is made through utilization of the channel model available from the channel estimation circuit 41.

Figure 10:
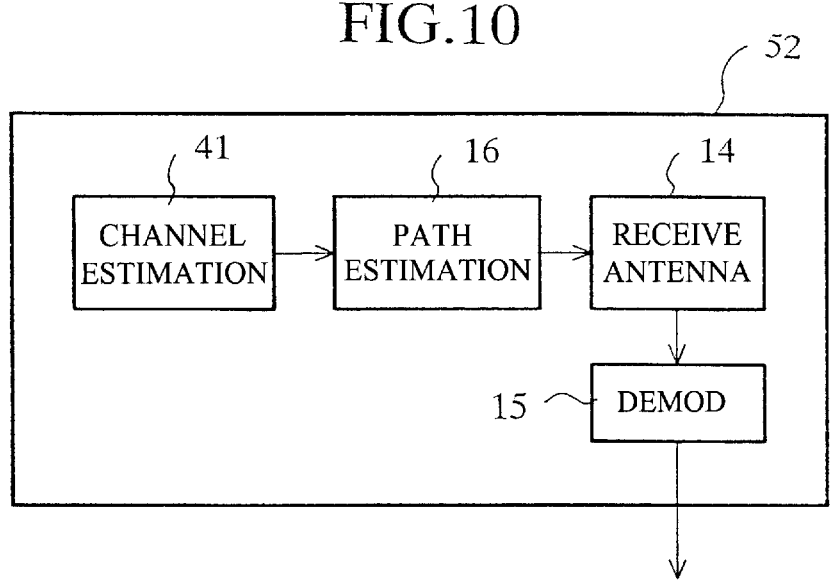
FIG. 10 is a diagram showing the block configuration of a demodulation part of a modem according to Embodiment 3 of the present invention.

FIG. 10 is a diagram depicting the block configuration of a demodulation part of a modem according to Embodiment 3 of the present invention, in which like reference numerals represent like or corresponding parts in FIG. 7. Detailed descriptions of the like parts will be omitted for brevity. In the figure, reference numeral 16 indicates a path estimating device, disposed between the channel estimation circuit 41 and the receiving antenna 14, for estimating a path between the transmitter and the receiver based on a 3-D channel model constructed by the channel estimation circuit 41 and for providing a control signal to the receiving antenna 14 to control its directivity. Reference numeral 52 denotes the demodulation part constituted by the path estimating device 16, the channel estimation circuit 41, the receiving antenna 14 and the demodulator 15.

Figure 11:
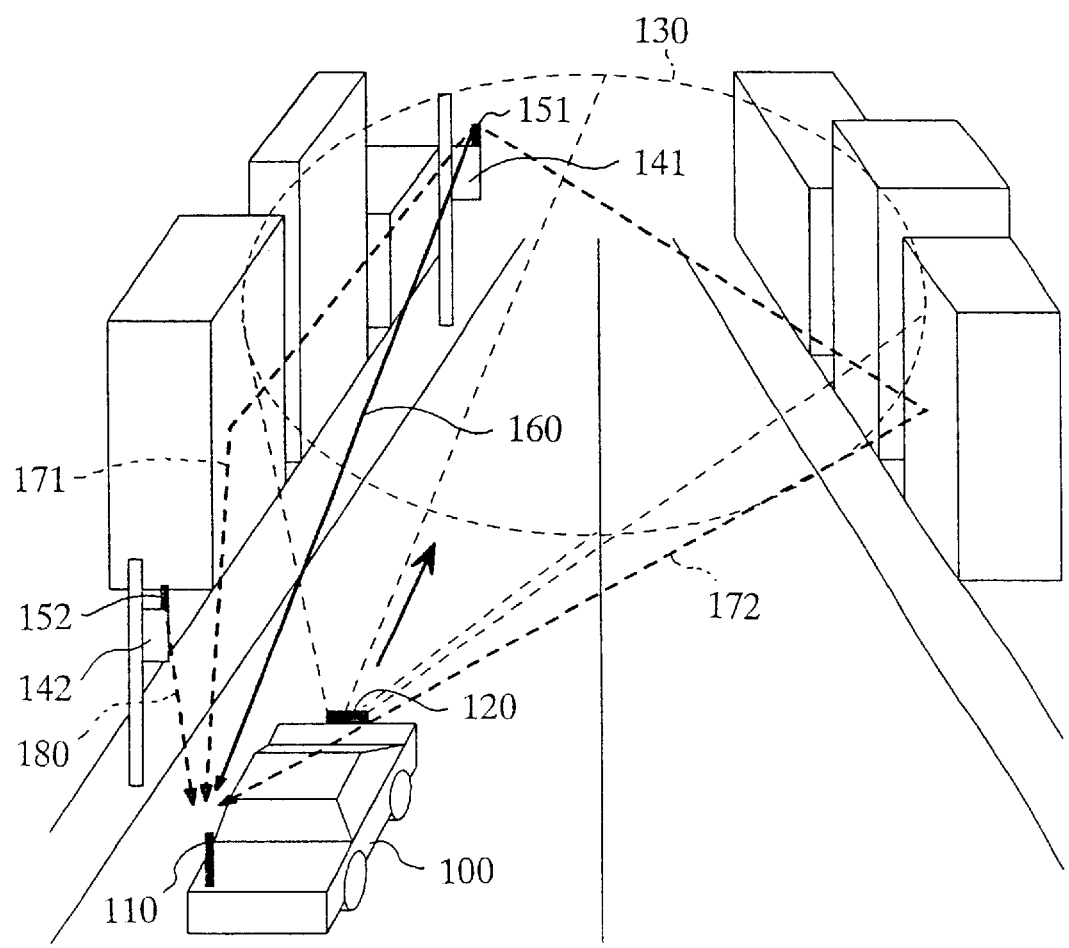
FIG. 11 is a diagrammatic representation of a system utilizing the demodulation part in Embodiment 3 of the present invention.

FIG. 11 is a diagrammatic showing of a channel estimation system that uses a modem having the demodulation part 52. Like reference numerals represent like or corresponding parts in FIG. 8, and hence the detailed description thereof will be omitted. In the figure, reference numerals 171 and 172 denote waves that are emitted from the pole-mounted antenna 151 serving as a transmitting antenna and are reflected by buildings, thereafter reaching the vehicle-mounted antenna 110 serving as a receiving antenna. Reference numeral 180 denotes an electric wave arriving at the vehicle-mounted antenna 110 from the pole-mounted antenna 152 of the base station 142 that is not communicating therewith.

The operation will be described below.

Figure 12:
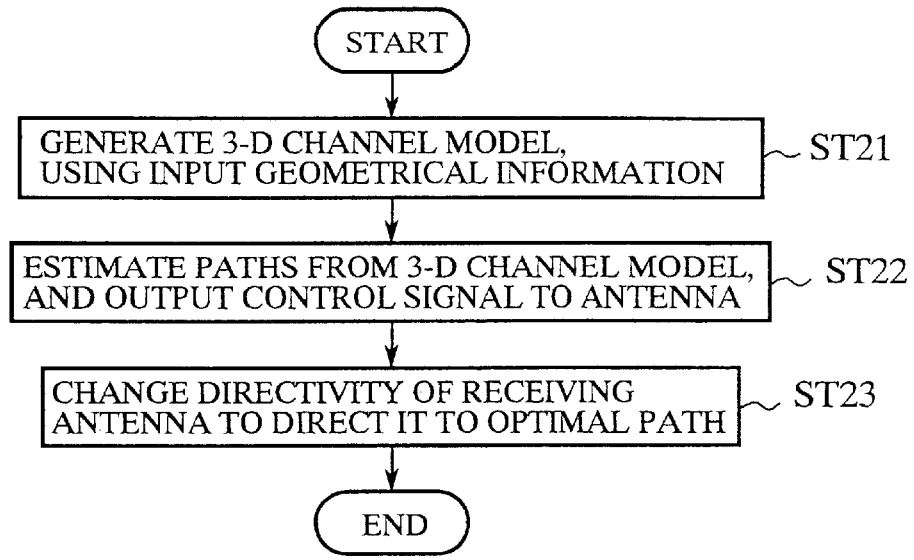
FIG. 12 is a flowchart showing the operation of the demodulation part in Embodiment 3 of the present invention.

In this case also, as the similar case to Embodiment 2, there is considered the case of receiving signals from the base station 141 by the radio terminal mounted on the vehicle 100 driving down the road in town in the direction indicated by the arrow in FIG. 11. The operation of the demodulation part 52 of FIG. 10 is shown in FIG. 12.

As similar to Embodiment 2, in step ST21 the channel estimation circuit 41 takes in geometrical information on the scenery ahead of the vehicle and formulates a 3-D channel model, and provides it to the path estimating device 16. In the next step ST22, the path estimating device 16 estimates paths of the direct wave 160 and the reflected waves 171 and 172 shown in FIG. 11 based on the 3-D channel model received from the channel estimation circuit 41, determines an optimal path for communication among the estimated paths, and applies a control signal to the receiving antenna 14 so as to select the optimal path. In the next step ST23, the receiving antenna 14 changes its directivity toward the optimal path in response to the control signal received from the path estimating device 16.

Figure 13:
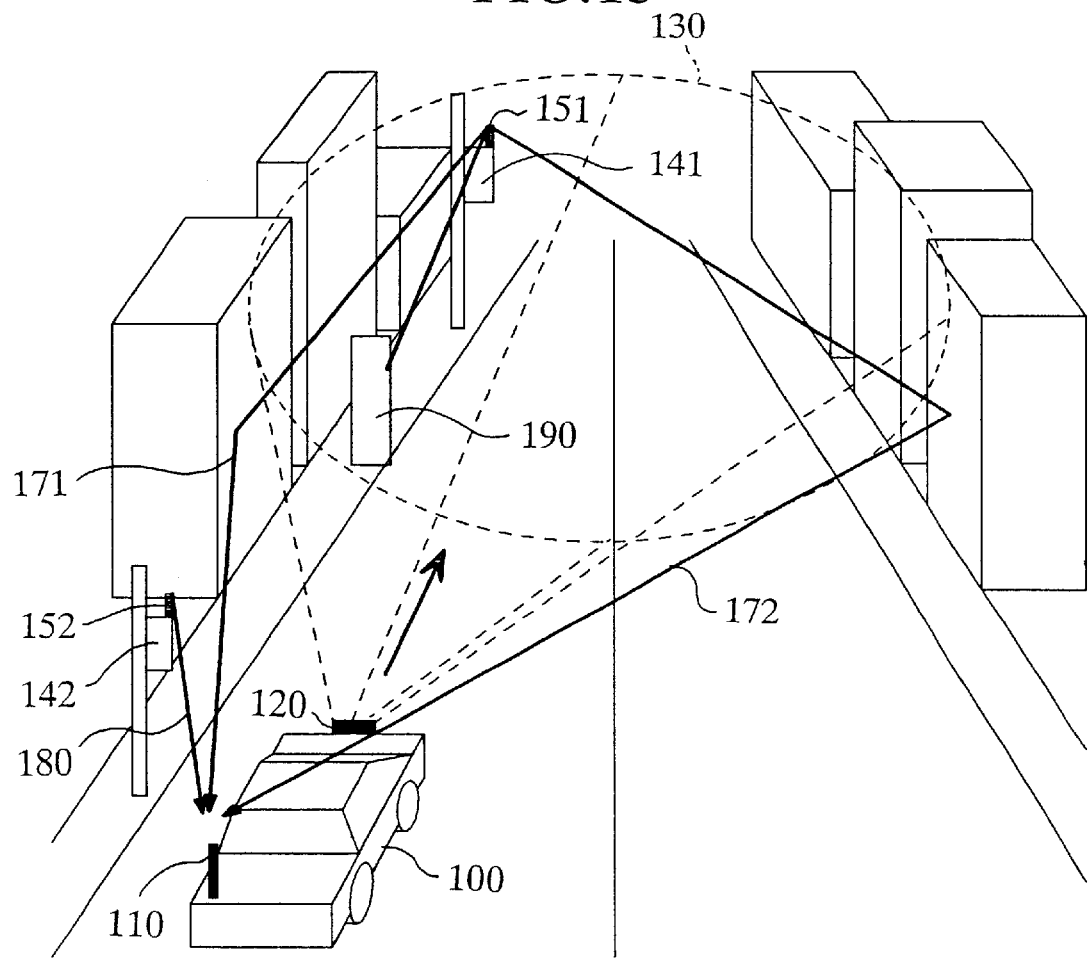
FIG. 13 is a diagrammatic representation of channels in Embodiment 3 of the present invention in the case where an obstacle exists between transmitting and receiving antennas.

In this instance, as depicted in FIG. 11, if there is no obstacle between the pole-mounted the transmitting antenna 151 and the vehicle-mounted antenna 110 serving as the receiving antenna 14, the path of the direct wave 160 between the pole-mounted antenna 151 and the vehicle-mounted antenna 110 will be chosen as the optimal path in step ST22. On the other hand, as shown in FIG. 13, when the direct wave 160 is blocked by an obstacle 190 lying between the pole-mounted antenna 151 and the vehicle-mounted antenna 110 so that it cannot reach the antenna 110 directly from the antenna 151, that one of the paths of the reflected waves 171 and 172 which is estimated to have better transmission quality is chosen as the optimal channel in step ST22.

By repeating this procedure hereinafter, it is possible to control the directivity of the receiving antenna 14 in real time, thereby permitting communication over the optimal path and hence ensuring high-quality communication.

As described above, according to Embodiment 3, the optimal path based on the transmission model is always used for communication, it is possible to secure high-quality communication even when the direct wave 160 is blocked by the obstacle 190 and to follow also a quick change in the channel.

EMBODIMENT 4

While Embodiment 3 has been described to change at the receiver (the terminal installed in the vehicle) side the directivity of the receiving antenna toward the optimal path for communication, this procedure can also be carried out at the transmitter (the base station) side. In such a case, the 3-D transmission model is used to estimate the optimum one of the paths between the transmitter and the receiver, and the directivity of the transmitting antenna (the pole-mounted antenna) is changed based on the result of estimation.

EMBODIMENT 5

Figure 14:
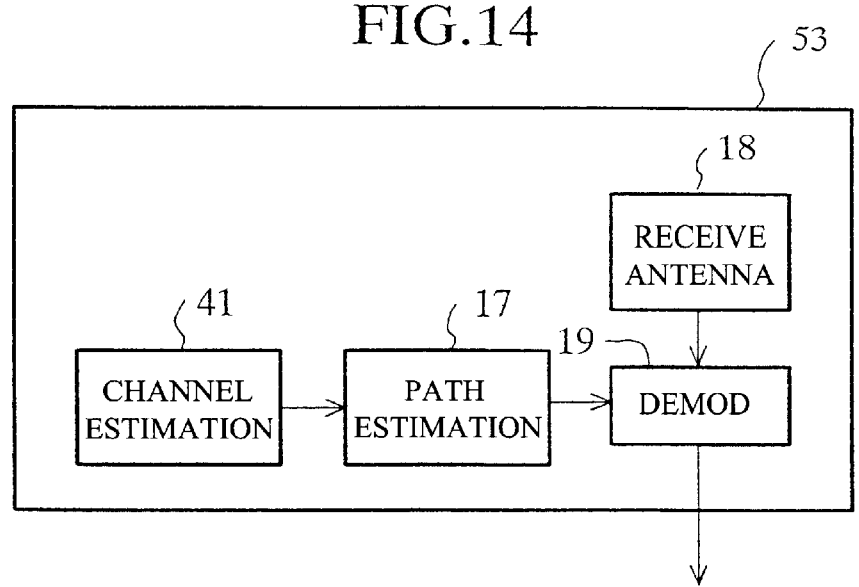
FIG. 14 is a diagram showing the block configuration of a demodulation part of a modem according to Embodiment 5 of the present invention.

FIG. 14 is a diagram depicting the block configuration of a demodulation part of a modem according to Embodiment 5 of the present invention. In the figure, reference numeral 41 denotes a channel estimation circuit of the same configuration as that described previously in connection with Embodiment 1, and reference number 17 denotes a path estimating device that estimates paths available between the receiver and the transmitter based on the 3-dimensional channel model provided by the channel estimation circuit 41, and provides the resulting path information. Reference numeral 18 denotes a non-directional receiving antenna, and 19 denotes a demodulator which, upon reception of the path information from path estimating device 17, eliminates or combines multi-path components from the signals received by the receiving antenna 18, thereby suppressing the influence of the multi-path components. Reference numeral 53 denotes a demodulation unit made up of the channel estimation circuit 41, the path estimating device 17, the receiving antenna 18 and the demodulator 19.

Figure 15:
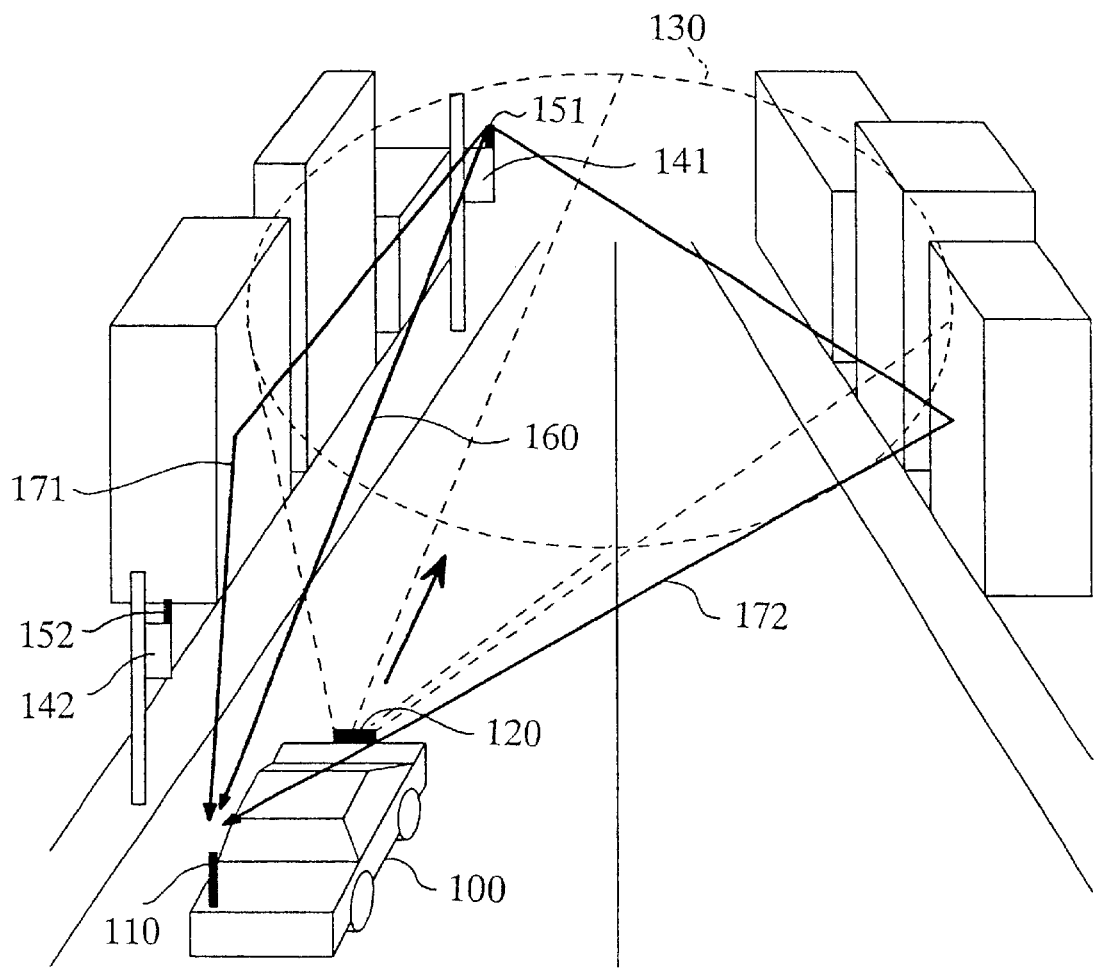
FIG. 15 is a diagrammatic representation of a system utilizing the demodulation part in Embodiment 5 of the present invention.

In addition, FIG. 15 is a diagrammatic showing of a channel estimation system equipped with such a demodulation part 53 in its modem. Like reference numerals indicate like or corresponding parts in FIG. 11, with their detailed description omitted for brevity.

The operation will be described below.

Also in this case, it is assumed as in Embodiment 2 that the radio terminal mounted on the vehicle 100 receives a signal from the base station 141 as shown in FIG. 15. FIG. 16 is a flowchart showing the operation of the demodulation part 53 shown in FIG. 14 at that time.

First, in step ST31, as in Embodiment 2, the channel estimation circuit 41 constructs a 3-D channel model, and provides the model to the path estimation device 17 connected thereto at the following stage. Upon reception of this channel model from the channel estimation circuit 41, the path estimating device 17 estimates paths based on the model in step ST32. The path estimating device 17 then obtains information on the delay time, phase deviation, and attenuation of each estimated path, and provides the information as path information to demodulator 19. In step ST33, upon reception of the path information from path estimating device 17, the demodulator 19 eliminates or combines multi-path components in the received signal, that is, components of the reflected wave 171 and 172 in accordance with the path information, thereby suppressing the influence of the multi-path components.

Now, let it be assumed that the path of the direct wave 160 and two paths of the reflected waves 171 and 172 have been estimated by the path estimating device 17 as shown in FIG. 15. In this instance, the signal received by the non-directional antenna 18 is a combined version of signals having passed over the three paths. The reflected wave components 171 and 172 in the three received signals have been delayed because of their path lengths larger than that of the direct wave component 160, and have undergone phase shifts due to reflections. The received signals are thus distorted by the signal components of the two reflected waves 171 and 172, constituting a major factor for the degradation of transmission quality. Therefore, it is important to eliminate the signal components of these reflected waves 171 and 172.

Next, a description will be given, with reference to FIG. 17, of an example of eliminating the components of the reflected waves 171 and 172.

Let it be assumed here that the paths of the direct wave 160 and the two reflected waves 171 and 172 have been estimated to exist as the result of the path estimation by the path estimating device 17 and that parameters of the respective paths have been obtained as given below.

Direct wave 160: delay time=0, no reflection

Reflected wave 171: delay time t1, reflection coefficient=0.5

Reflected wave 172: delay time t2, reflection coefficient=0.25

From these parameters, the received signal is decomposed into three signal components corresponding to the direct wave 160 and the reflected waves 171 and 172, respectively. FIG. 17 shows waveforms of these signal components. FIG. 17(*a*) shows the received signal, FIG. 17(*b*) the component of the direct wave 160, the same figure (c) the component of the reflected wave 171 and the same figure (d) the component of the reflected wave 172. The demodulator 19 generated demodulated data, using only the component of with direct wave 160 extracted from the received signal.

In addition, as described above, according to Embodiment 5, the multi-path components are eliminated from the received signal through utilization of the path information available from the 3-D channel model, it is possible to achieve high-quality communication free from the influence of the multi-path components even when a non-directional antenna is used as the receiving antenna 18.

Further, although in the above the components of the reflected waves 171 and 172 are removed from the received signal through utilization of the path information supplied by the path estimating device 17 to suppress the influence of the multi-components, it is also possible to suppress the influence of the multi-path components by combining the components of the reflected waves 171 and 172 and the direct wave 160 through the use of the path information provided from the path estimating device 17.

Moreover, in the above description, when no obstacle lies between the transmitting antenna and the receiving antenna, the influence of the multi-path components is suppressed by eliminating or combining the components of the reflected waves 171 and 172 in the received signal through the use of the path information. When the obstacle 190 lies in the path of the direct wave 160 as depicted in FIG. 13, the influence of the multi-path components is lessened by eliminating from the reflected wave 171 or 172 signal components other than those estimated to have good transmission quality, or by combining them.

EMBODIMENT 6

While Embodiments 2 through 5 have been described to establish communication outdoors between the base stations and the vehicle-mounted terminal, the systems are equally applicable to an in-house communication system such as a local area network (hereinafter referred to as LAN). In such a case, since objects such as walls and the ceilings of a building and the facilities like desks and shelves are fixed, prestoring of information on them will avoid the need for formulating the 3-D transmission model in real time and hence permits reduction of the number of objects to be sensed in real time, making it possible to attaining the object of estimating channels with less computational complexity.

EMBODIMENT 7

Although the embodiments of the present invention have been described as being applied to a mobile communication system between base stations and the radio terminal carried in a vehicle and to LAN, the invention is also applicable to a satellite communication system that utilizes an orbiting satellite.

Figure 18:
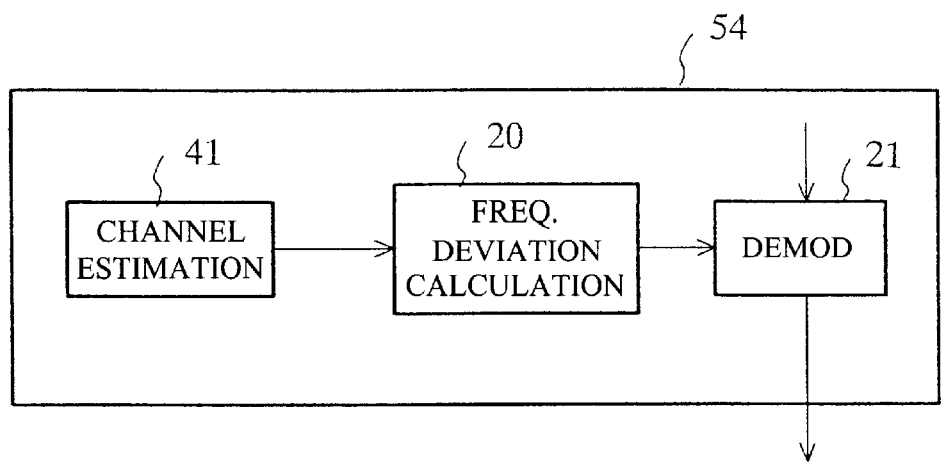
FIG. 18 is a diagram showing the block configuration of a demodulation part of a modem according to Embodiment 7 of the present invention.

FIG. 18 is a block diagram of a demodulation part of a modem according to Embodiment 7 for use in such a satellite communication system. This demodulation part also has the channel estimation circuit 41 which is the same in structure as that described previously in respect of Embodiment 1. In the figure, reference numeral 20 denotes a frequency deviation calculation circuit that estimates a frequency deviation due to a Doppler shift, which occurs at the time of channel switching, i.e. when the communication channel is switched from one satellite to another based on a 3-D channel model available from the channel estimation circuit 41, and provides the estimated frequency deviation as frequency information estimated frequency at the time of switching from one satellite to another. Reference numeral 21 denotes a demodulator 21 provided with a circuit that eliminates the frequency deviation due to the Doppler shift involved in the switching of the communication channel, based on the frequency information provided by the frequency deviation calculation circuit 20. Reference numeral 54 denotes a demodulation part composed of the channel estimation circuit 41, the frequency deviation calculation circuit 20 and the demodulator 21.

Figure 19:
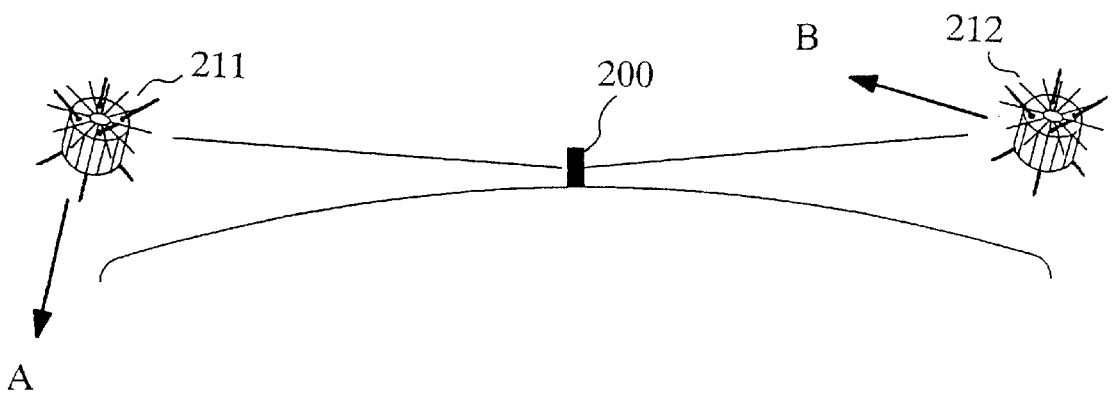
FIG. 19 is a diagram for explaining the operation of a system utilizing the demodulation part in Embodiment 7 of the present invention.

FIG. 19 is a diagram for explaining the operation of a satellite communication system that uses a modem equipped with the demodulation part 54 of the above-mentioned configuration. In the figure, reference numeral 200 denotes an antenna of an earth station having the above-mentioned modem. Reference numeral 211 denotes a communication satellite which is currently communicating with the earth station and is orbiting away from the antenna 200 in the direction indicated by arrow A. Reference numeral 212 denotes another communication satellite 212 which is orbiting in the direction indicated by the arrow B and hence toward the antenna 200 and will start communication with the earth station at the time of the next channel switching.

Next, the operation will be described.

Figure 20:
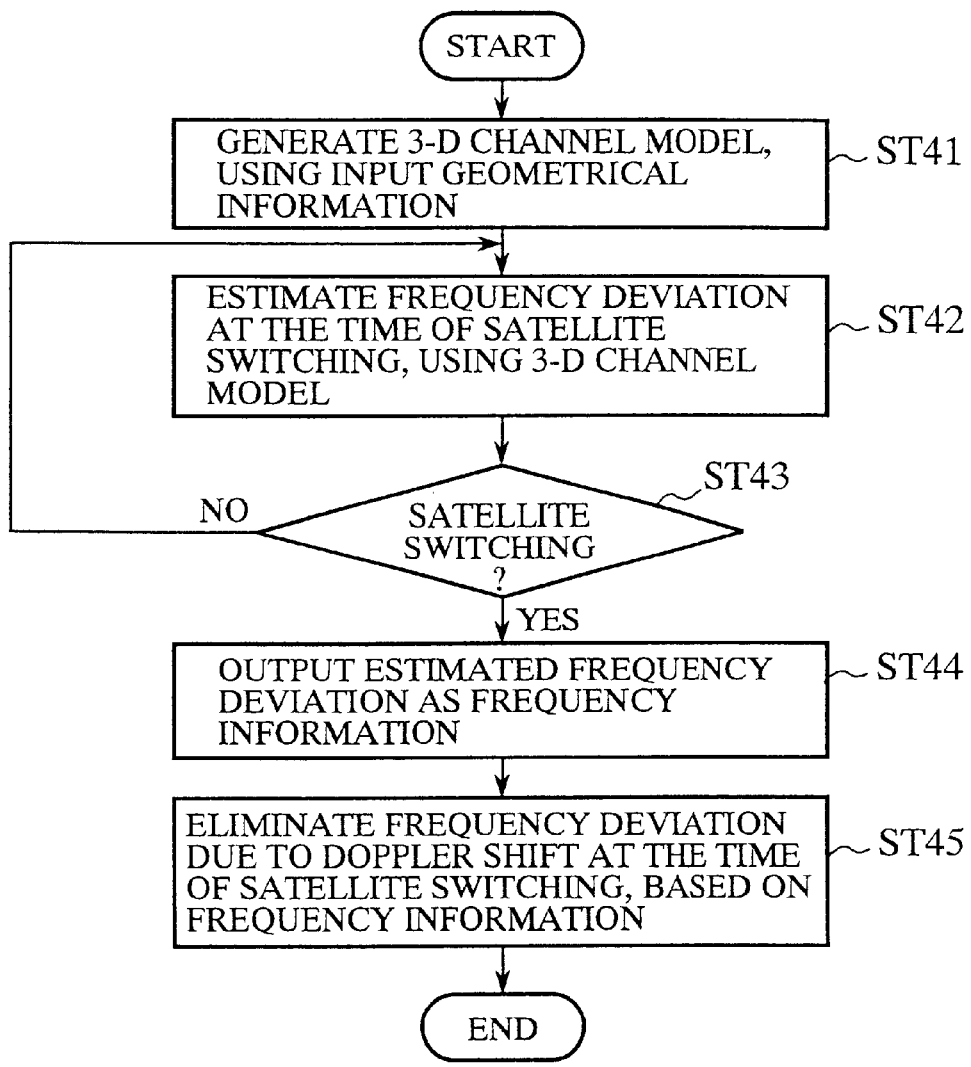
FIG. 20 is a flowchart showing the operation of the demodulation part in Embodiment 7 of the present invention.
Figure 21:
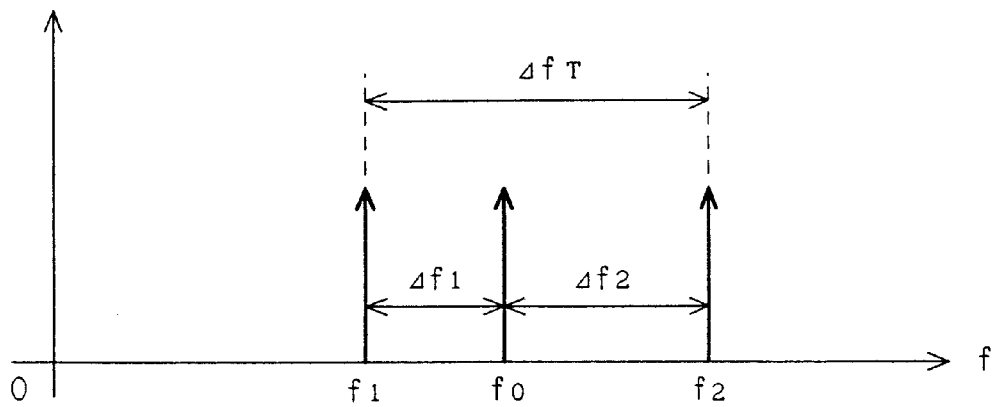
FIG. 21 is a diagram for explaining a frequency deviation due to a Doppler shift in Embodiment 7 of the present invention.

FIG. 20 is a flowchart showing the operation of the demodulation part 54 of such a configuration as depicted in FIG. 18, and FIG. 21 is a graph for explaining frequency deviations of the received signals due to the Doppler shift.

First, the operation starts with step ST41, in which a 3-D channel model is formed based on the geometrical information input by the channel estimation circuit 41. In addition, the 3-D channel model is produced in the same manner as described in connection with Embodiment 2. It is assumed here that communication satellites available for creating the 3-D channel model are the satellites 211 currently communicating with the earth station and the satellite 212 awaiting communication with the earth station subsequent to channel switching (satellite switching). Since the satellite 211 is moving away from the antenna 200, the frequency of the wave therefrom is shifted to a lower frequency due to the Doppler shift, while the satellite 212 is approaching the antenna 200 and hence the frequency of the wave therefrom is shifted to a higher frequency due to the Doppler shift. Consequently, as the satellite channel is switched from the satellite 211 to the satellite 212, a large frequency deviation will result.

In step ST42, the frequency deviation calculation circuit 20 always estimates this frequency deviation due to the Doppler shift by the switching of the satellite channel, based on the 3-D channel model sent from the channel estimation circuit 41. When the satellite switching is detected afterward in step ST43, the procedure proceeds to step ST44, where the frequency deviation calculation circuit 20 outputs the estimated frequency deviation, as frequency information, to the demodulator 21. Then in step ST45 the demodulator 21 performs demodulation by removing the frequency deviation due to the Doppler shift according to the frequency information received from the frequency deviation calculation circuit 20.

Here, according to the example shown in FIG. 21, since the communication satellite 211 currently in communication with the earth station is moving away from its antenna 200, the frequency f1 now in use for the communication is lower than the inherent frequency f0 by $\Delta f1$ due to the Doppler shift. On the other hand, since the communication satellite 212 to be connected to the earth station next is approaching its antenna 200, the frequency f2 of a channel to be established with the satellite 212 will be higher than the inherent channel frequency f0 by $\Delta f2$ due to the Doppler shift. Thus, the frequency deviation calculation circuit 20 will always estimate, as a frequency deviation anticipated to be caused by satellite switching, the sum $\Delta fT$ ($\Delta fT=\Delta f1+\Delta f2$) of the frequency deviation $\Delta f1$ due to the Doppler shift in the channel of the communication satellite 211 and the frequency deviation $\Delta f2$ due to the Doppler shift in the channel of the communication satellite 212.

As described above, according to Embodiment 7, since the frequency deviation by the Doppler shift at the time of channel switching (satellite switching) can be eliminated by continual estimation of the frequency deviation, a quick pull-in of the satellite channel is possible.

EMBODIMENT 8

Figure 22:
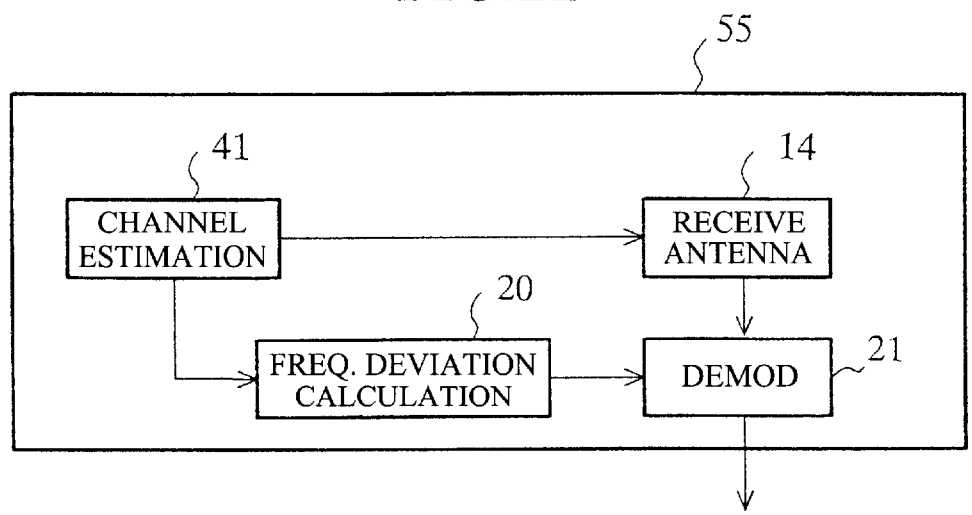
FIG. 22 is a diagram showing the block configuration of a demodulation part of a modem according to Embodiment 8 of the present invention.

Here, as Embodiment 8 of the present invention, there will be described in which the demodulation part of the modem according to Embodiment 2 includes the frequency deviation calculation circuit and the demodulator for eliminating the frequency deviation according to Embodiment 7. FIG. 22 is a diagram depicting the block configuration of the demodulation part of the modem according to Embodiment 8. In the figure, reference numeral 41 denotes a channel estimation circuit of such a configuration as described previously with respect to Embodiment 1; 14 denotes a receiving antenna capable of changing its directivity in accordance with information based on a 3-D channel model produced by the channel estimation circuit 41; 20 denotes a frequency deviation calculation circuit from which the frequency deviation estimated from the 3-D channel model by the channel estimation circuit 41 is output as frequency information at the time of satellite switching; and 21 denotes a demodulator provided with a circuit whereby the frequency deviation at the time of satellite switching is eliminated based on the frequency information. The channel estimation circuit 41 and the receiving antenna 14 are identical with those used in Embodiment 2. The frequency deviation calculation circuit 20 and the demodulator 21 are identical with the corresponding components used in Embodiment 7. Reference numeral 55 denotes a demodulation part made up of the channel estimation circuit 41, the receiving antenna 14, the frequency deviation calculation circuit 20 and the demodulator 21.

The operation will now be described below.

Figure 23:
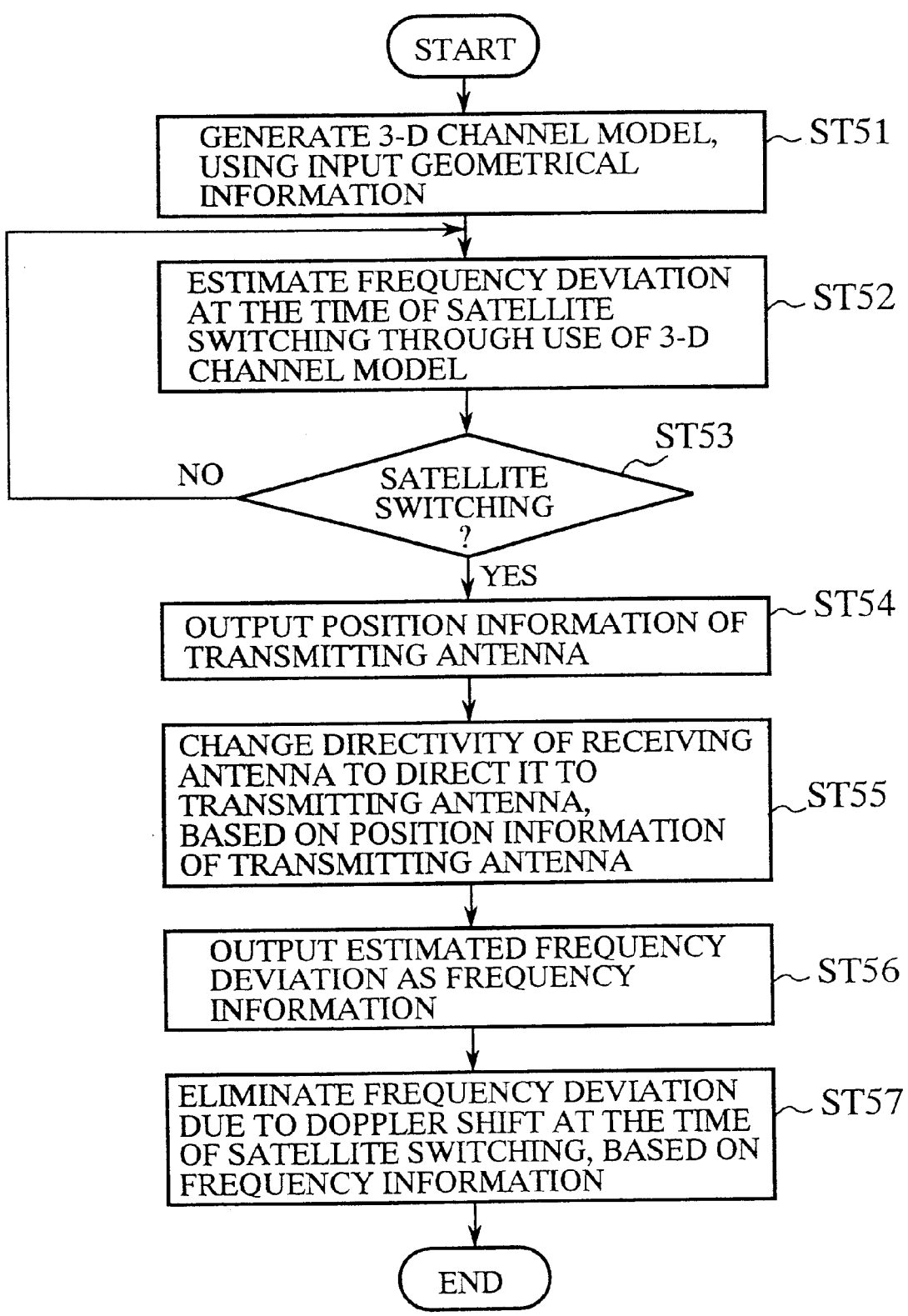
FIG. 23 is a flowchart showing the operation of the demodulation part in Embodiment 8 of the present invention.

FIG. 23 is a flowchart showing the operation of the demodulation unit 55 having the structure shown in FIG. 22. As in Embodiment 7, firstly a 3-D channel model is formed by the channel estimation circuit 41 in step ST51, and a frequency deviation due to Doppler shift is estimated by the frequency deviation calculation circuit 20 based on the 3-D channel model by the channel estimation circuit 41 in step ST52. And in step ST53 the channel switching is continually monitored, and upon occurrence of satellite switching, the procedure proceeds to step ST54, in which the channel estimation circuit 41 supplies the receiving antenna 14 with information on the position of the transmitting antenna (representing the position of the satellite in communication) based on the 3-D channel model. Then in step ST55 the receiving antenna 14 changes its directivity toward the transmitting antenna based on the position information on the transmitting antenna. In the next step ST56, the frequency deviation calculation circuit 20 provides, as the frequency information, the frequency deviation estimated based on the 3-D channel model to the demodulator 21. In step ST57 the demodulator 21 having received the frequency information performs demodulation by eliminating the frequency deviation due to the Doppler shift involved in the satellite channel switching.

As described above, according to Embodiment 8, it is possible to eliminate the frequency deviation due to Doppler shift associated with channel switching and hence perform a quick initial pull-in operation as well as elimination of multi-path components, thereby providing higher quality communication.

In addition, while in the above the frequency deviation calculation circuit and the demodulator according to Embodiment 7 have been described to be used in the demodulation part of the modem according to Embodiment 2, it is needless to say that the frequency deviation calculation circuit and the demodulator according to Embodiment 7 are also applicable to the demodulation parts of the modems of Embodiments 3 through 5.

With such an arrangement, the initial pull-in operation can be made faster; high-quality communication can be established even when the direct wave is blocked by an obstacle; an abrupt change in channel can easily be followed; and sufficiently high-quality communication can be achieved even if a non-directional antenna is used.

EMBODIMENT 9

Figure 24:
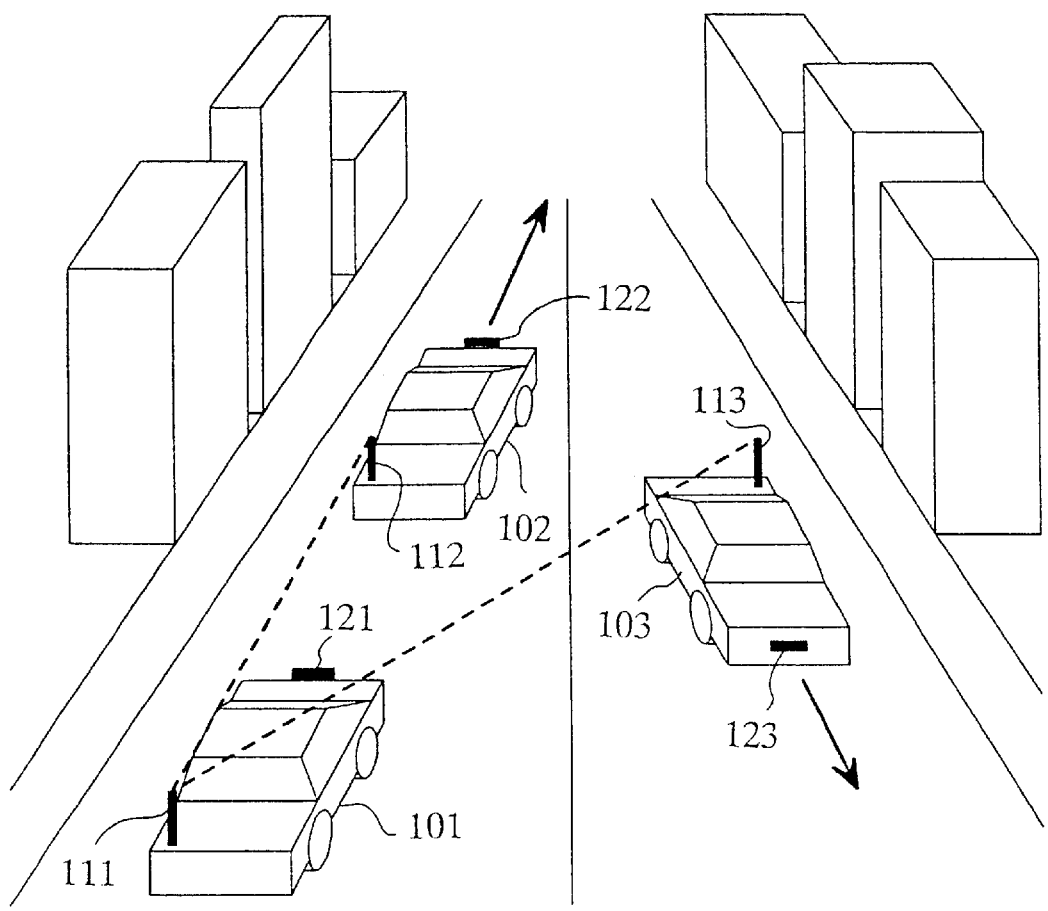
FIG. 24 is a diagrammatic representation of a channel estimation system according to Embodiment 8 of the present invention.

Although Embodiment 8 has been described to apply the invention to the satellite communication system employing orbiting satellites, the invention is also applicable to the communication between moving vehicles. FIG. 24 is a diagrammatic showing of the channel estimation system according to Embodiment 9 of the present invention. In the figure, reference numerals 101–103 designate vehicles driving down a town road; 111–113 designate vehicle-mounted antennas that are radio terminals installed in the vehicles 101–103; and 121–123 designate vehicle-mounted cameras of the vehicles 101–103 for geometrically taking in the surrounding conditions.

The operation will be described below.

As in Embodiment 7, the position of a vehicles to communicate with is geometrically recognized. Further, the position of a vehicle to which the channel is switched next is also geometrically recognized. A 3-D channel model is formulated and an estimation is always made of a frequency deviation that arises from Doppler shift when the channel is switched. When the channel is actually switched, the directivity of the receiving antenna is changed and, at the same time, the frequency deviation due to Doppler shift is eliminated. By directing the antenna of the local station towards a desired antenna (of the counterpart station), and by suppressing multi-path components, it is possible to suppress interference waves from other stations than the desired one.

EMBODIMENT 10

Figure 25:
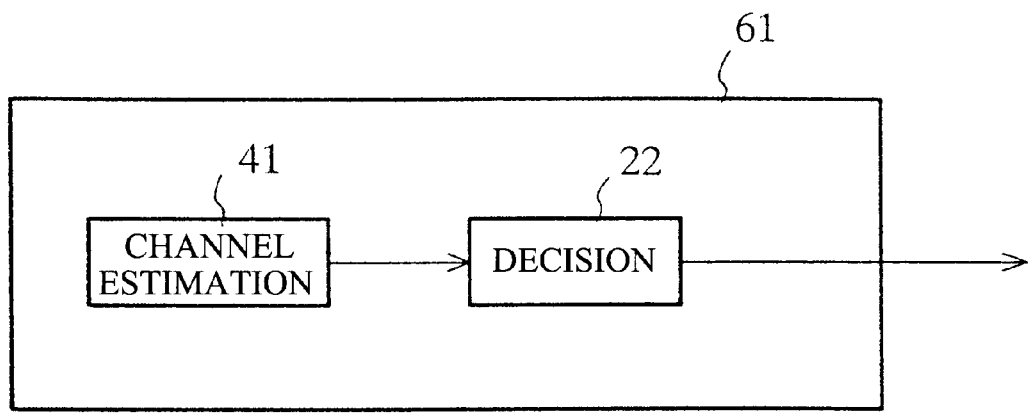
FIG. 25 is a diagrammatic showing the block configuration of an equalizer switch of a modem according to Embodiment 10 of the present invention.

FIG. 25 is a diagram depicting the block configuration of an equalizer switch for ON/OFF control of the equalizer of a demodulation part in a modem according to Embodiment 10 of the present invention. Reference numeral 41 indicates a channel estimation circuit which is identical in construction with the channel estimation circuit described previously in respect of Embodiment 1. Reference numeral 22 indicates a decision circuit, which estimates the path between the transmitter and the receiver based on the 3-D channel model obtained by the channel estimation circuit 41, decides the necessity of operation of the equalizer of the demodulation part in the modem, and supplies the equalizer with a control signal based on the result of the decision. Reference numeral 61 denotes an equalizer switch 61 constituted by the channel estimation circuit 41 and the decision circuit 22.

The operation will be described below.

Figure 26:
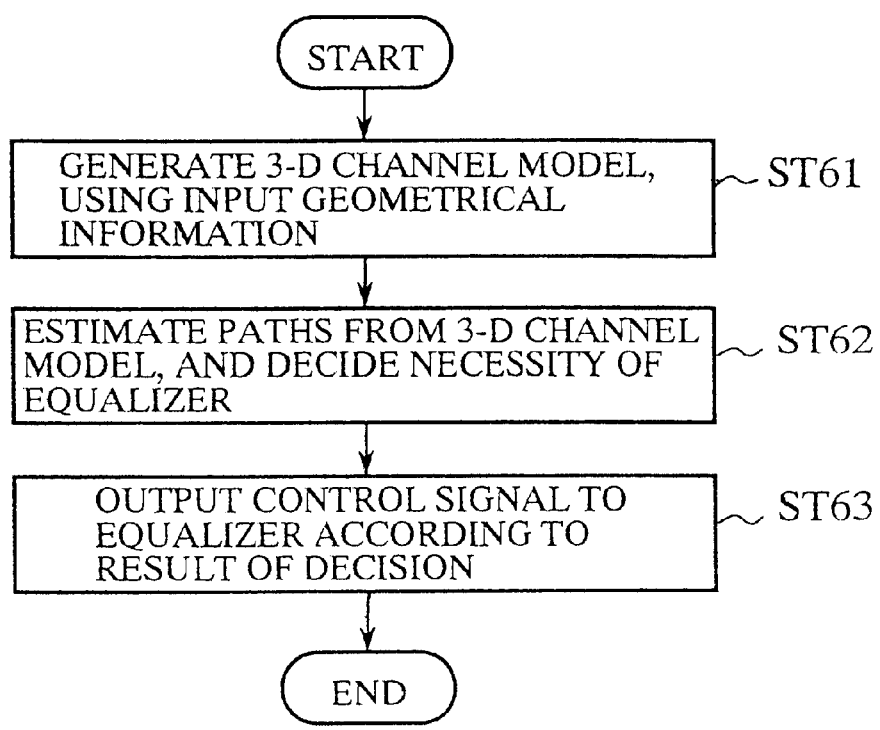
FIG. 26 is a flowchart showing the operation of the equalizer switch in Embodiment 10 of the present invention.

FIG. 26 is a flowchart showing the operation that is performed by the equalizer switch 61 of such a configuration as depicted in FIG. 25. In the first step ST61, the channel estimation circuit 41 takes in geometrical information on the ambient conditions ahead of the vehicle and constructs a 3-D channel model as in Embodiment 1, and then provides the model to the decision circuit 22. Upon reception of the channel model from the channel estimation circuit 41 in the next step ST62, the decision circuit 22 estimates the path based on the channel model, and makes a determination as to whether the equalizer is necessary or not. If it is determined that the equalizer is necessary, the decision circuit 22 generates, in step ST63, a control signal to enable the equalizer of the demodulation part of the modem. However, if it is determined that the equalizer is not needed, the decision circuit 22 generates a control signal to disable the equalizer in step ST63.

As described above, according to Embodiment 10, unnecessary operation of the equalizer can be avoided by ON/OFF control based on the surrounding conditions, permitting reduction of power consumption of the system.

EMBODIMENT 11

Figure 27:
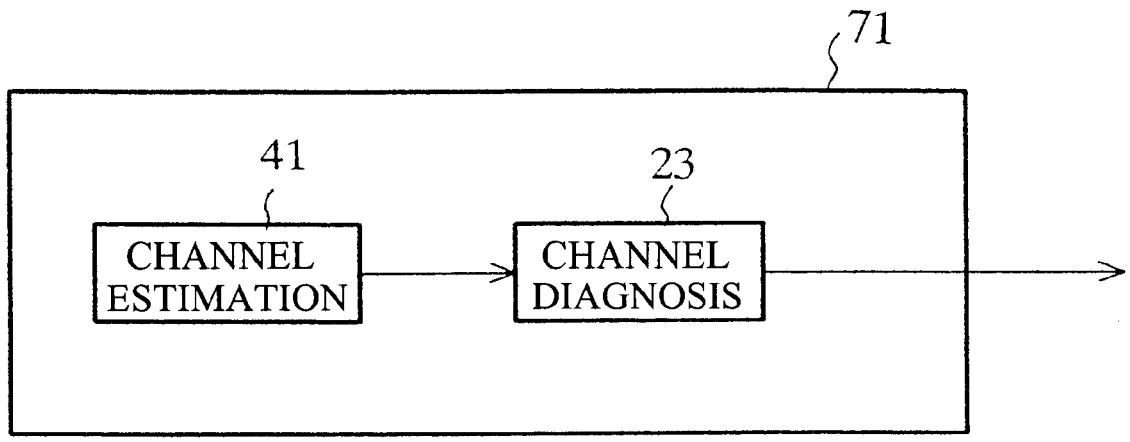
FIG. 27 is a diagram showing the block configuration of a transmission rate determination part of a modem according to Embodiment 11 of the present invention.

FIG. 27 is a diagram depicting the block configuration of a transmission rate determination part for determining the transmission rate, in a modem according to Embodiment 11 of the present invention. In FIG. 27, reference numeral 41 denotes a channel estimation circuit of the same configuration as that described previously in connection with Embodiment 1. Reference numeral 23 denotes a channel diagnosis circuit for determining an optimal transmission rate of the channel between the transmitter and the receiver, by diagnosing the conditions of the channel on the basis of a 3-D channel model received from channel estimation circuit 41. Reference numeral 71 denotes a transmission rate determination part made up of the channel estimation circuit 41 and the channel diagnosis circuit 23.

Next, the operation will be described.

Figure 28:
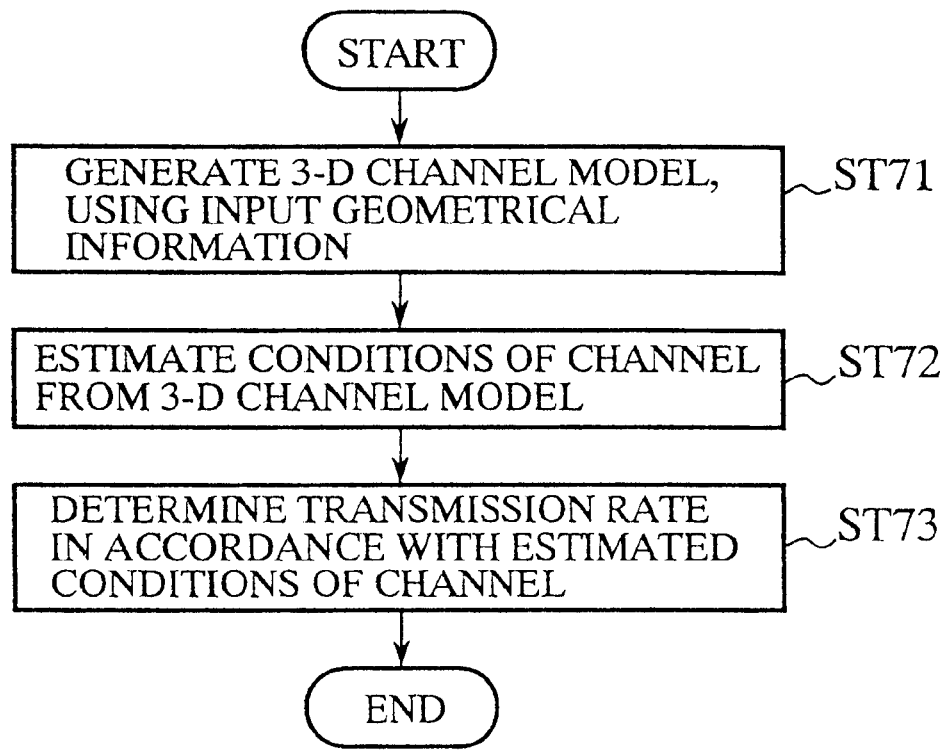
FIG. 28 is a flowchart showing the operation of the transmission rate determination part in Embodiment 11 of the present invention.

FIG. 28 is a flowchart showing the operation of the transmission rate determination part 71 shown in FIG. 27. As in Embodiment 1, the channel estimation circuit 41 first takes in geometrical information on the ambient conditions ahead of the vehicle to form a 3-D channel model in step ST71 and provides the model to the channel diagnosis circuit 23. In step ST72, based on the 3-D channel model from the channel estimation circuit 41, the channel diagnosis circuit 23 diagnoses the conditions of the channel between the transmitter and the receiver. In step ST73, based on the conditions of the channel diagnosed in step ST72, an optimal transmission rate is determined, and a control signal based on the determined transmission rate is applied to a modulator and a demodulator connected in the subsequent stage, thereby controlling the transmission rate. For example, when the channel is in a good condition, a high-speed transmission is executed, but when the condition of the channel is bad, a low-speed transmission is executed.

As described above, according to Embodiment 11, the condition of the channel between the transmitter and the receiver is diagnosed and the transmission rate is controlled accordingly, whereby this permits efficient communication at an optimal transmission rate.

EMBODIMENT 12

While Embodiment 5 has been described in connection with the case of searching for the pole-mounted transmitting antenna from the vehicle-mounted camera, it is also possible to search for the vehicle-mounted antenna of a radio terminal (the receiver) from the base station (the transmitter).

Figure 29:
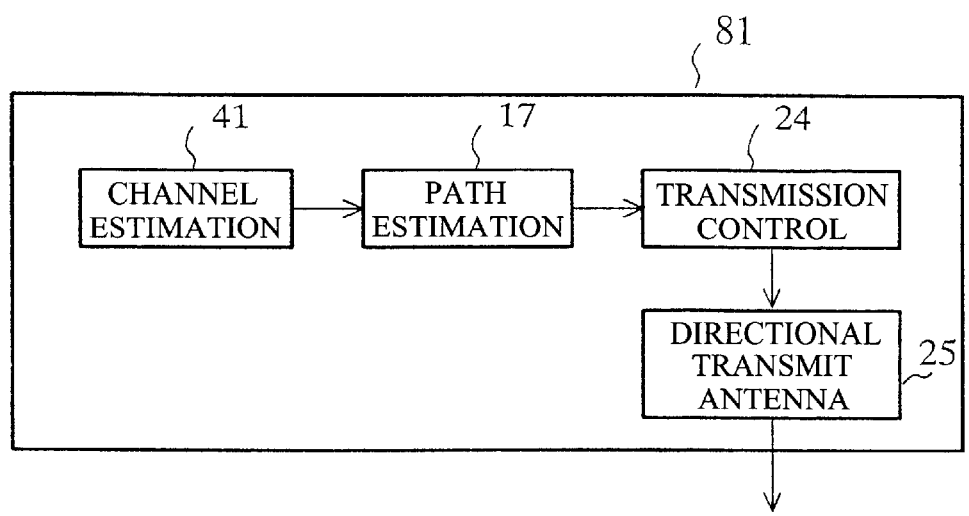
FIG. 29 is a diagram showing the block configuration of a transmission part of a modem according to Embodiment 12 of the present invention.

FIG. 29 is a diagram depicting the block configuration of a transmitter unit of a modem according to Embodiment of the present invention. In the figure, reference numeral 81 denotes the same channel estimation circuit as that used in Embodiment 4, and 17 denotes the same path estimating device as that used in Embodiment 5. Reference numeral 24 denotes a transmission control part that generates a control signal based on the path information obtained by the path estimating device 17 and transmits the control signal to a transmitting antenna described later on. Reference numeral 25 denotes a directional transmitting antenna that determines the pattern of transmission based on the control signal received from the transmission control unit 24 and transmits transmission signals in accordance with the pattern. Reference numeral 81 denotes a transmission part composed of the channel estimation circuit 41, the path estimating device 17, the transmission control part 24 and the transmitting antenna 25.

Figure 30:
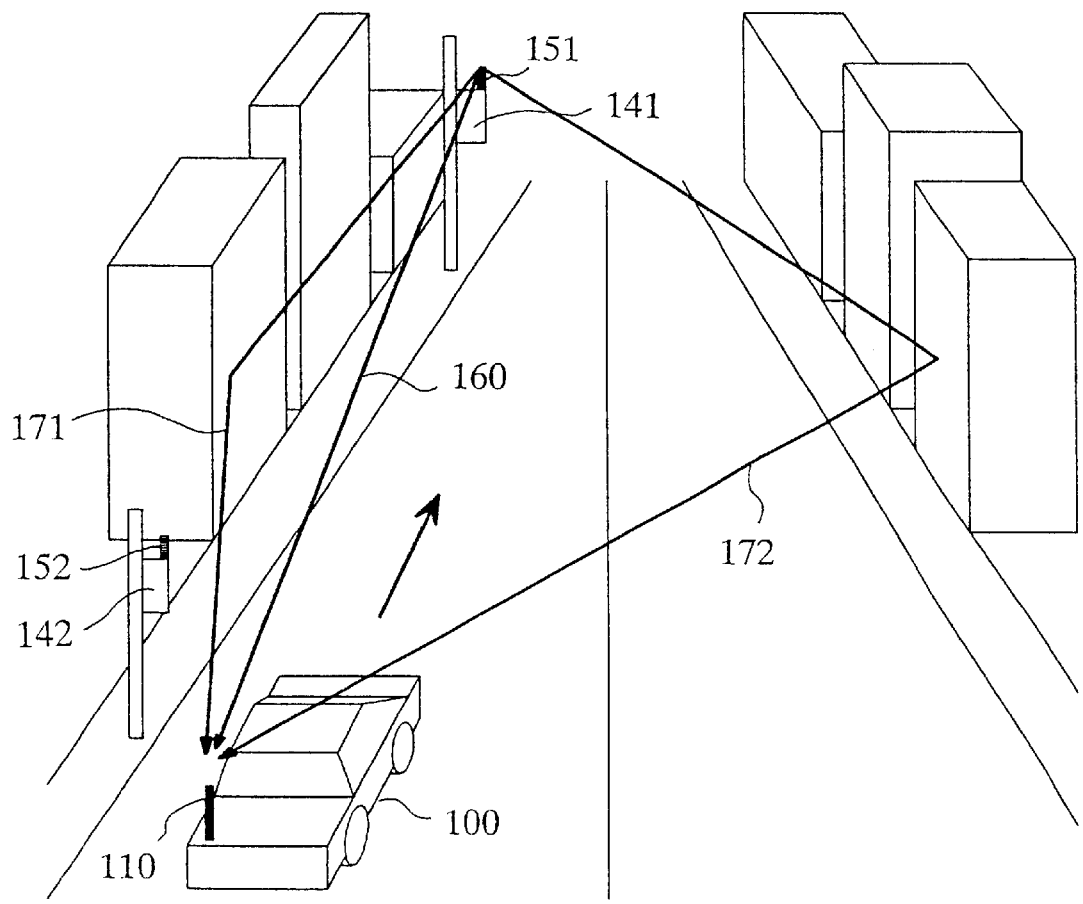
FIG. 30 is a diagrammatic representation of a system utilizing the transmission part according to Embodiment 12 of the present invention.

FIG. 30 is a diagrammatic showing of the channel estimation system using a modem equipped with such a transmission part. The parts corresponding to those in FIG. 15 are identified by the same reference numerals and their descriptions will be omitted.

Next, the operation will be described.

Figure 31:
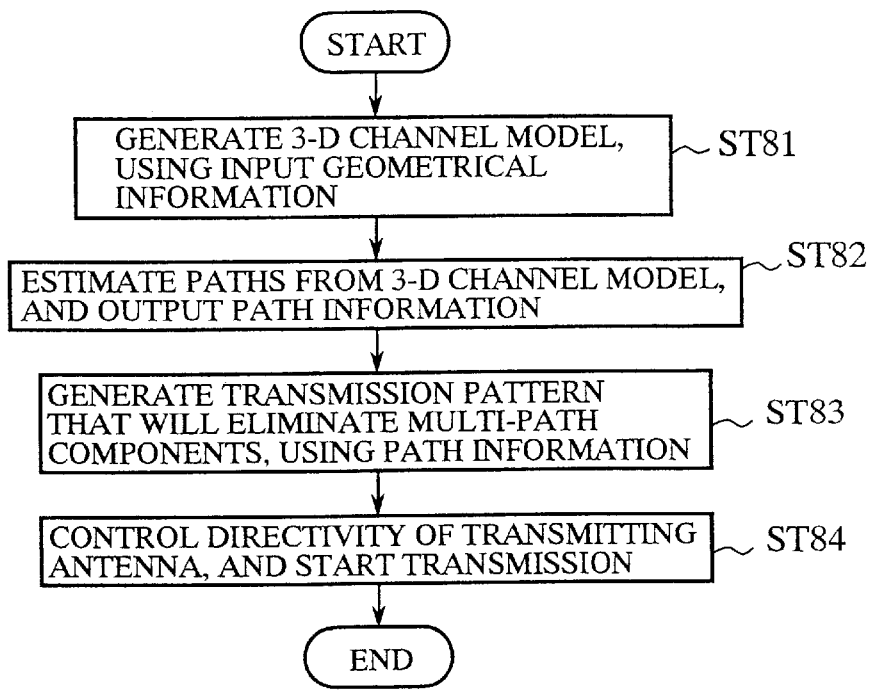
FIG. 31 is a flowchart showing the operation of the transmission part in Embodiment 12 of the present invention.

Also in this case, there is considered the communication between the vehicle-mounted radio terminal of the vehicle 100 and the base station 141 as shown in FIG. 30. FIG. 31 is a flowchart showing the operation of the transmission part 81 depicted in FIG. 29.

First, the channel estimation circuit 41 creates a 3-D channel model and transmits it to the path estimating device 17 in step ST81. In step ST82, upon reception of the channel model, the path estimating device 17 estimates the path between the transmitter and the receiver, based on the 3-D channel model, and supplies the transmission control part 24 with the path information based on the result of estimation. In this instance, a search is now made by the base station 141 for the antenna 110 mounted on the vehicle 100, instead of searching for the pole-mounted antenna 151 by the vehicle-mounted camera 120 as in the case of Embodiment 5.

Figure 32A:
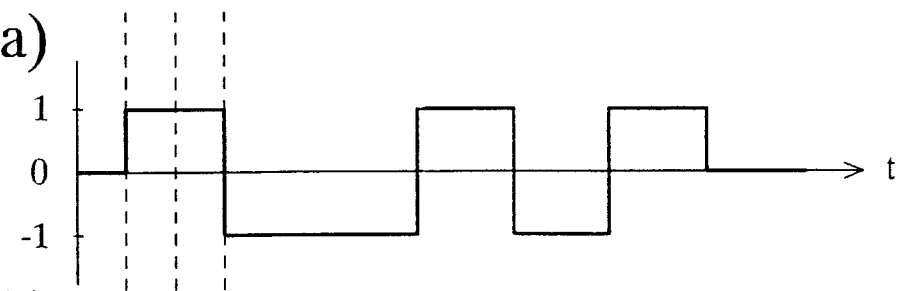
FIG. 32 is a timing chart showing temporal relationships between estimated direct and reflected wave components in Embodiment 12 of the present invention.
Figure 32B:
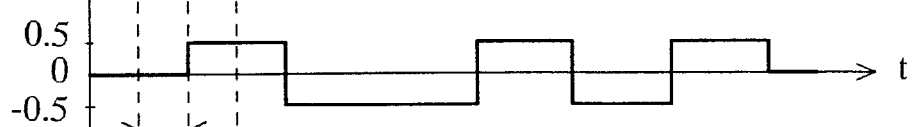
Figure 32C:
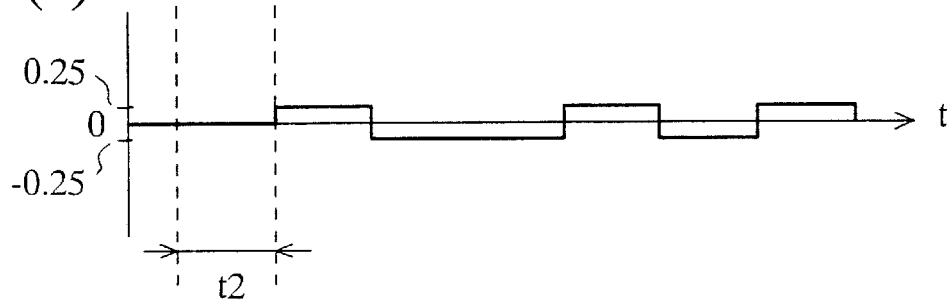

It is assumed now that estimations have been made by the path estimating device 17 for the direct wave path 160 and for the two reflected wave paths 171 and 172 as shown in FIG. 30. FIG. 32 shows waveforms of the signal components in the respective paths; FIG. 32(*a*) shows the component of the direct wave 160, FIG. 32(*b*) the component of the reflected wave 171, and FIG. 32(*c*) the component of the reflected wave 172. Unless the transmitter (base station 141) controls its emission of signals, the signal received by the receiving antenna (the vehicle-mounted antenna 110) appears like the one shown in FIG. 17(*a*) for Embodiment 5, since the received signal is a combined version of the three components from the three transmission paths. One way to suppress the influence of the multi-path effect is to control the transmission pattern of the transmitting antenna 25 (the pole-mounted antenna 151) at the transmitting side.

Accordingly, the transmission control unit 24 generates in step ST83 a transmission pattern based on the path information received from the path estimating device 17, and provides the transmission pattern to the transmitting antenna 25 so that the transmitting antenna 25 sends its beam over a desired one of the three estimated paths depicted in FIG. 30. In the next step ST84, the transmitting antenna 25 controls its directivity to transmit signals based on the transmission pattern received. This eliminates superfluous paths, and hence lessens the influence of the multi-path components. By such control at the transmitting side, it is possible to exclude the influence of the multi-path components even if the receiving antenna is non-directional.

In addition, although the influence of multi-path components is lessened in the above embodiment by setting the transmission beam of the transmitting antenna 25 in a desired transmission path, the influence of the multi-path components may be suppressed equally by using a multibeam antenna as the transmitting antenna 25 and controlling each of the beams such that the influence of the multi-path components is suppressed. Since the delay times of the reflected waves 171 and 172 with respect to the direct wave 160 are known to be t1 and t2, respectively, as the result of path estimation, the delay times are provided to the respective paths to prevent the reflected waves from being delayed in the receiving antenna.

Figure 33:
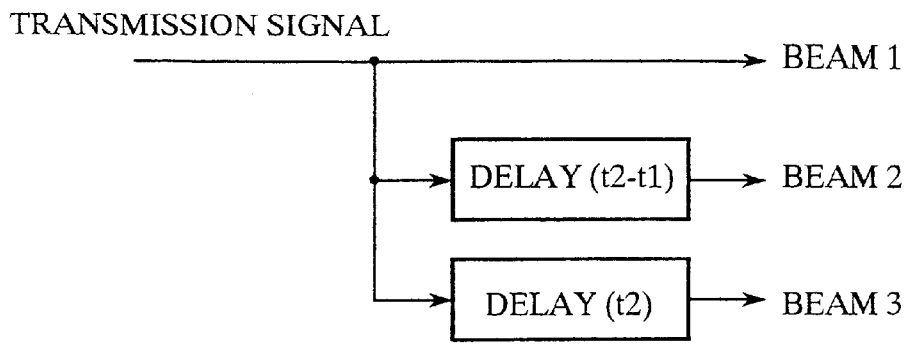
FIG. 33 is a diagram for explaining the operation of a transmitting antenna in Embodiment 12 of the present invention.

For example, it is assumed that the pole-mounted antenna 151 (the transmitting antenna 25) depicted in FIG. 30 is a three-beam antenna, emitting beams in three directions, such as the beam of the direct wave 160 (beam 3), the beam of the reflected wave 171 (beam 2) and the beam of the reflected wave 172 (beam 3). And the beams are transmitted after being delayed as shown in FIG. 33; the delay times in the transmission of the beams may be set as follows:

Beam 1: delay=0;
Beam 2: delay=t2−t1; and
Beam 3: delay=t2.

With this scheme of transmission, no delay wave is present in the signal received by the receiver, so that the influence of the multi-path components can be suppressed.

As described above, according to Embodiment 12, since control is effected at the transmitter side to lessen the influence of the multi-path components, no equalizer is needed in the receiver; furthermore, since the multi-path components are no longer present, a high quality transmission can be achieved even if a non-directional antenna is used at the receiving side.

EMBODIMENT 13

Figure 34:
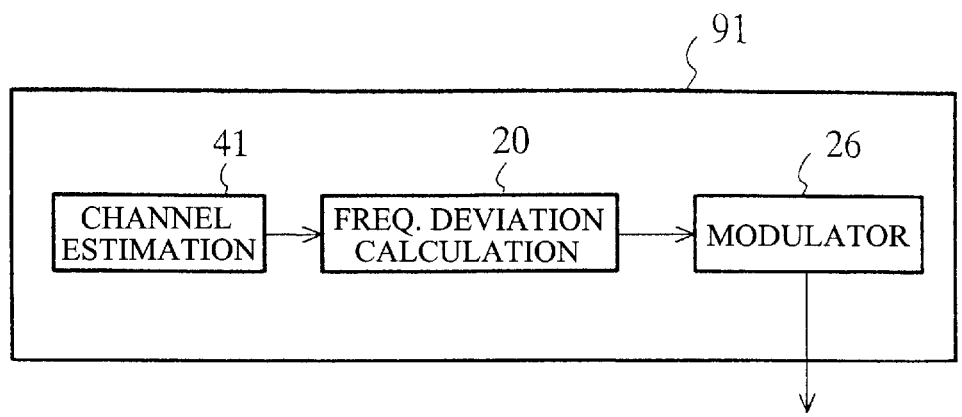
FIG. 34 is a diagram showing the block configuration of a modulation part of a modem according to Embodiment 13 of the present invention.

FIG. 34 is a diagram depicting the block configuration of a modulation unit of a modem according to Embodiment 13 of the present invention. In this figure, reference numeral 41 denotes a channel estimation circuit identical in construction with that described previously with reference to Embodiment 1; and reference numeral 20 denotes a frequency deviation calculation circuit which estimates a frequency deviation due to the Doppler shift by the channel switching, based on a 3-D channel model obtained by channel estimation circuit 41, and provides as frequency information the estimated frequency deviation when the channel switching actually occurs. Reference numeral 26 denotes a modulator which has a circuit for eliminating the frequency deviation due to the Doppler shift involved in the switching of the communication channel (from one satellite to another), based on the frequency information supplied from the frequency deviation calculation circuit 20, and which modulates and outputs transmission signals. Reference numeral 91 denotes a modulation part made up of the channel estimation circuit 41, the frequency deviation calculation circuit 20 and the modulator 26. The channel estimation circuit 41 and the frequency deviation calculation circuit 20 are the same as those used in Embodiment 7.

Figure 35:
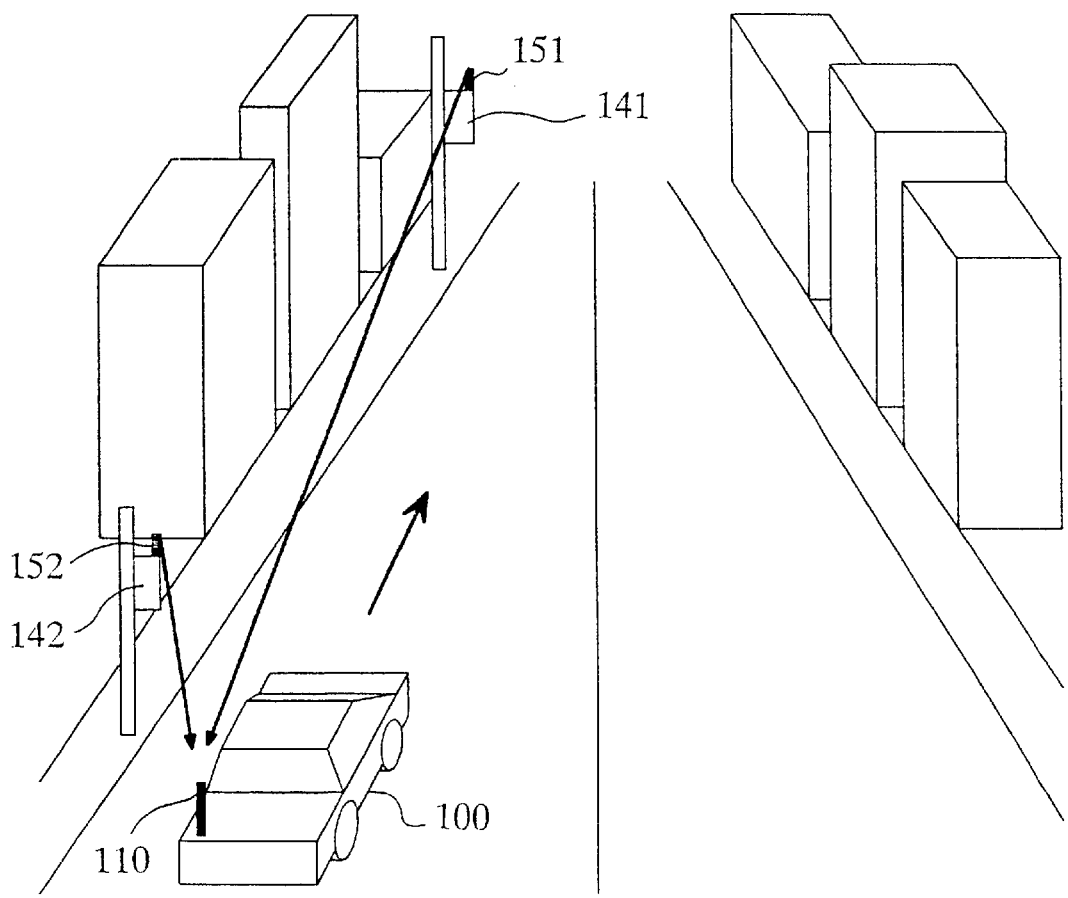
FIG. 35 is a diagrammatic representation of a system utilizing the modulation part in Embodiment 13 of the present invention.

FIG. 35 is a diagrammatic showing of the channel estimation system that uses a modem equipped with such a modulation part 91, and each part has reference numeral indicating like or corresponding parts in FIG. 15, so that the descriptions of such like parts will be omitted here.

Next, the operation will be described.

Figure 36:
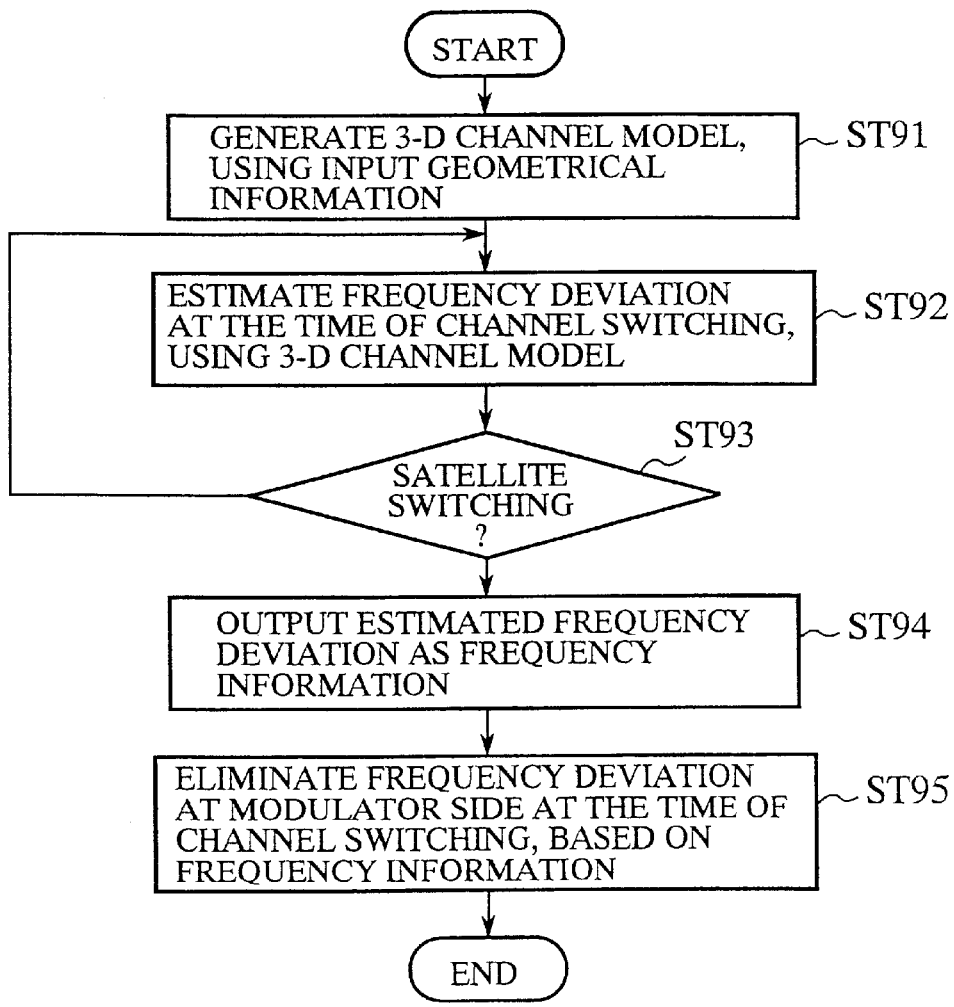
FIG. 36 is a flowchart showing the operation of the modulation part in Embodiment 13 of the present invention.

This embodiment will be described in connection with the case where the vehicle 100 with the radio terminal mounted thereon is traveling on a street in town and the vehicle-mounted terminal communicates with a base station. It is assumed that the vehicle-mounted terminal is in communication with the base station 142 as depicted in FIG. 35. Since the vehicle 100 is traveling in the direction from the base station 141 to the base station 142 as indicated by the arrow, the vehicle-mounted terminal switches its channel from the base station 142 to the next base station 141 at some point in time. In such an instance, the signal received by the vehicle-mounted antenna is then Doppler shifted to the higher frequency than the transmission frequency of the base station 141, as is the case with Embodiment 7. In the example described herein, the frequency deviation is estimated at the base station 141 side and signals are transmitted at a frequency free from the frequency deviation. FIG. 36 is a flowchart depicting the operation that the modulation part 91 shown in FIG. 34 performs.

In step ST91, firstly the channel estimation circuit 41 takes in geometrical information of the ambient conditions to form a 3-D channel model, and provides the model to the frequency deviation calculation circuit 20. At this stage, the vehicle-mounted terminal, which is anticipated to switch its channel to the local station (the base station 141), may be searched for based on information from another station like the base station 142, or it is possible to recognize all vehicle-mounted terminals around the local station and generate models of channels associated with them. As shown in step ST92, the frequency deviation calculation circuit 20 always estimates the frequency deviation due to the Doppler effect, based on the 3-D channel model received from the channel estimation circuit 41.

And channel switching is monitored in step ST93. When the channel is switched, the procedure proceeds to step ST94 where the estimated frequency deviation is provided as frequency information to the modulator 26. In step ST95, based on the frequency information fed from the frequency deviation calculation circuit 20 when the channel is switched, the modulator 26 controls the transmission frequency so that the frequency deviation due to the Doppler shift can be eliminated at the vehicle-mounted terminal to which the channel is switched.

Because the frequency deviation due to the Doppler shift can thus be removed when the channel is switched, the receiving side (the vehicle-mounted terminal) is relieved from a burden of dealing with the frequency variation by channel switching, permitting a fast initial pull-in operation.

Incidentally, in the example of FIG. 35, the vehicle-mounted terminal that is anticipated to switch its channel to the local station (the base station 141) is approaching the local station. Hence, if the base station 141 transmits with the frequency f0, the vehicle-mounted terminal receives with the frequency of f0+Δf by the Doppler effect. Therefore, in order that no frequency deviation may be caused by the channel switching at the vehicle-mounted terminal, the transmission frequency is set at f0+Δf in the modulator 20 when the channel is switched. To this end, the frequency deviation calculation circuit 20 always estimates the frequency deviation Δf, using the 3-D channel model provided from the channel estimation circuit 41. When the channel switching actually occurs, the frequency deviation calculation circuit 20 provides the frequency deviation Δf as frequency information to the modulator 26, which controls the transmission frequency in accordance with the frequency information.

As described above, according to Embodiment 13, the frequency deviation due to the Doppler shift can be removed at the time of channel switching, by continually calculating the frequency deviation Δf at the transmitting side, so that the receiving side need not to deal with the frequency deviation due to the Doppler shift by channel switching, thereby permitting a quick initial pull-in operation.

EMBODIMENT 14

Figure 37:
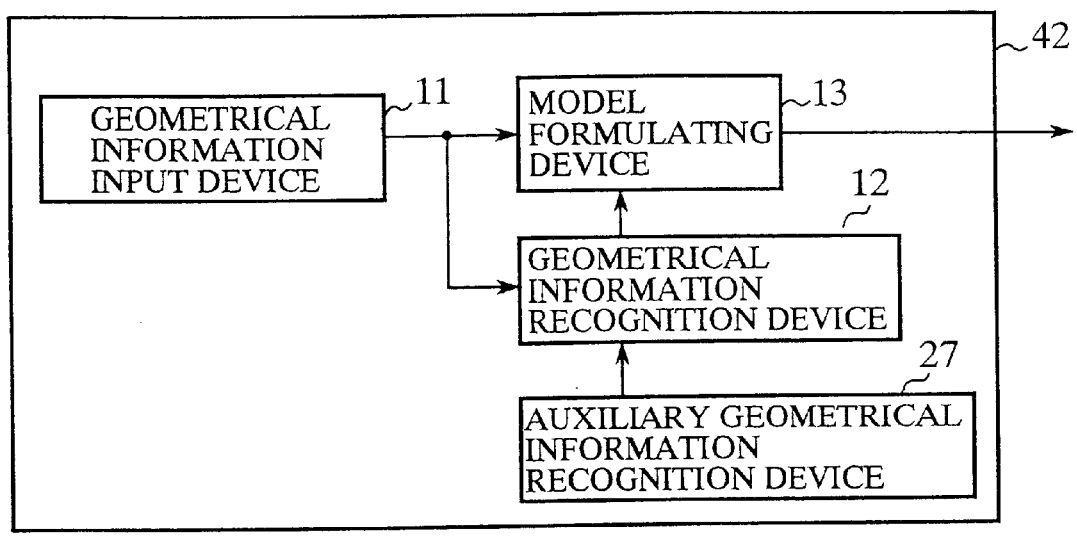
FIG. 37 is a diagram showing the block configuration of a channel estimation circuit according to Embodiment 14 of the present invention.

FIG. 37 is a diagram depicting the block configuration of a channel estimation circuit according to Embodiment 14 of the present invention; this Embodiment 14 further includes an auxiliary geometrical information recognition device having a global positioning system (hereinafter referred to as GPS), in the channel estimation circuit 41 described previously with reference to Embodiment 1. Like reference numerals indicates like or corresponding elements shown in FIG. 3, and detailed descriptions of these like elements will be omitted. In FIG. 37, reference number 27 denotes an auxiliary geometrical recognition unit that facilitates recognition of the transmitting antenna of the distant station based on map information available from GPS in a process to recognize the antenna from the geometrical information taken in by the geometrical information input device 11. Reference numeral 42 denotes a channel estimation circuit made up of the auxiliary geometrical information recognition unit 27, the geometrical information input device 11, the geometrical information recognition device 12 and the model formulating device 13.

Next, the operation will be described.

Figure 38:
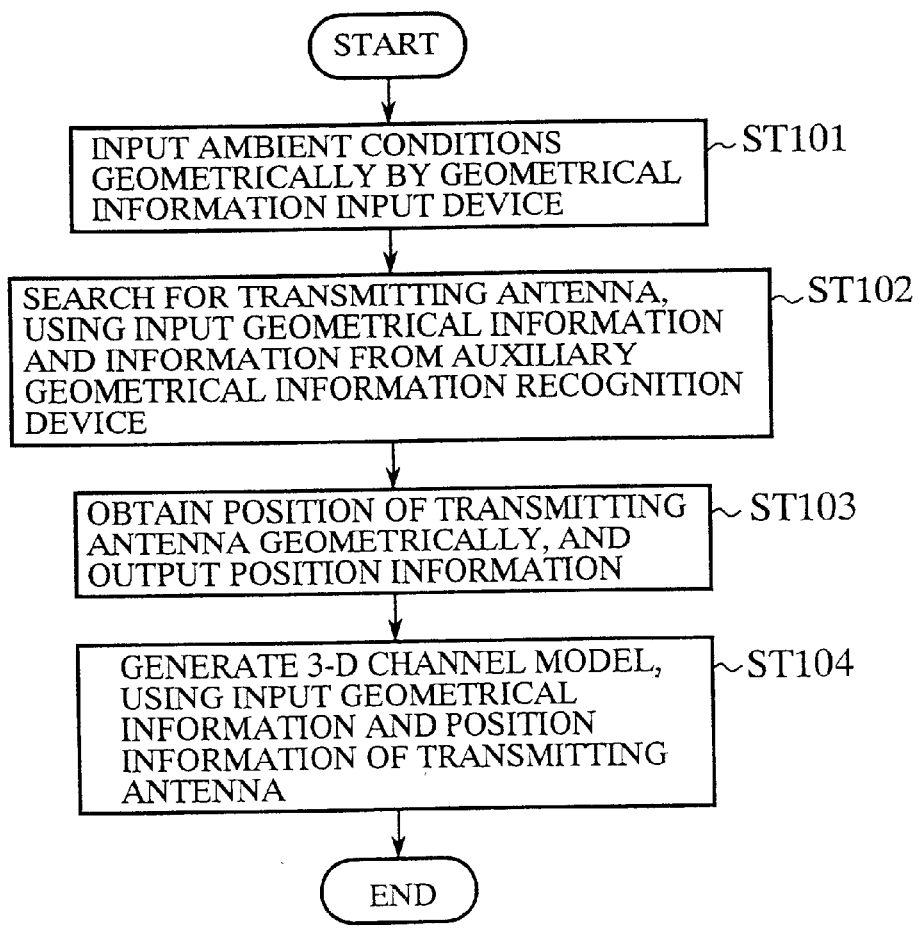
FIG. 38 is a flowchart showing the operation of the channel estimation circuit in Embodiment 14 of the present invention.
Figure 39:
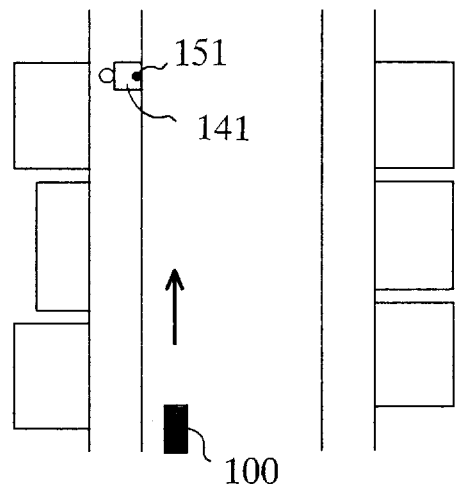
FIG. 39 is a diagram showing an example of the output from an auxiliary geometrical information recognition device in Embodiment 14 of the present invention.
Figure 40:
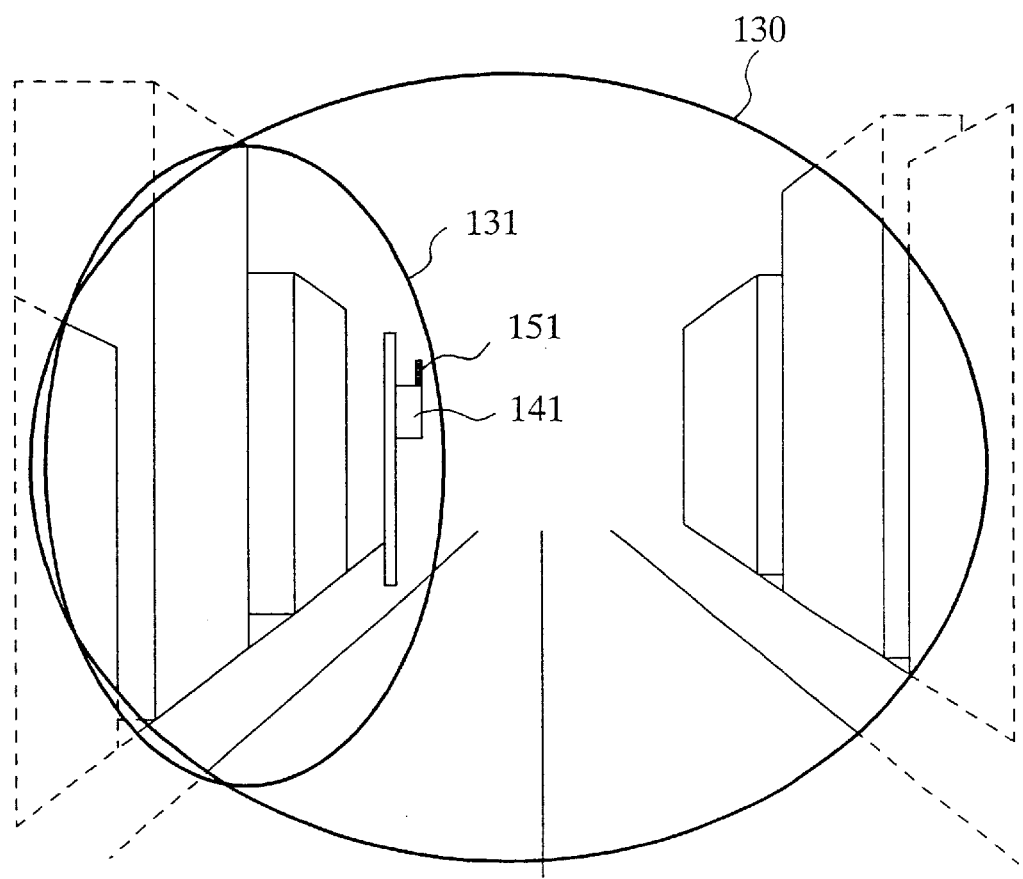
FIG. 40 is a diagram for explaining the operation for geometrical information recognition in Embodiment 14 of the present invention.

Here, FIG. 38 is a flowchart depicting the operation of the channel estimation circuit 42 of such a configuration as shown in FIG. 37. FIG. 39 shows an example of an output generated by the auxiliary geometrical information recognition unit 27 of the channel estimation circuit 42. FIG. 40 is a diagram for explaining the geometrical information recognizing operation of the auxiliary geometrical information recognition unit 27.

As is the case with Embodiment 1, geometrical information of the surrounding conditions in the direction in which the vehicle is traveling is first taken in by the geometrical information input device 11 such as a vehicle-mounted camera in step ST101. In this case, since the location of the transmitting antenna of the counterpart station is not generally known, it is necessary to recognize all the objects taken in the geometrical information. It is now assumed that the current location of the vehicle is provided by GPS while the vehicle is moving. GPS provides the vehicle with the currently recognized location of the vehicle itself on a map as shown in FIG. 39. Thus, when the locations of the transmitting antenna (pole-mounted antenna 151) and other objects such as nearby buildings are known, information (e.g. locations, heights, and shapes) of these objects are described on the map. For instance, in the FIG. 39 example, the auxiliary geometrical information recognition part 27 equipped with GPS provides information that the pole-mounted antenna 151 of the base station 141 is located on the left side of the street, and as depicted in FIG. 40, of the entire geometrical information taken in the image-sensing scope 130 of the vehicle-mounted camera, only such a limited part of the information as a marked region 131 on the left of the street is recognized geometrically.

As described above, according to Embodiment 14, since geometrical information in an irrelevant domain need not be recognized in the recognition procedure, a search for the antenna of the counterpart station and the estimation of the channels involved are simplified, so that these procedures may be made faster.

EMBODIMENT 15

While Embodiments 2 through 13 have been described in connection with a modem utilizing the channel estimation circuit 41 described in Embodiment 1, it is also possible to employ the channel estimation circuit 42 described above in respect of Embodiment 14. This embodiment will be described in connection with the case where the modem according to Embodiment 2 uses the channel estimation circuit 42 according to Embodiment 14 in place of the channel estimation circuit 41 according to Embodiment 1.

Figure 41:
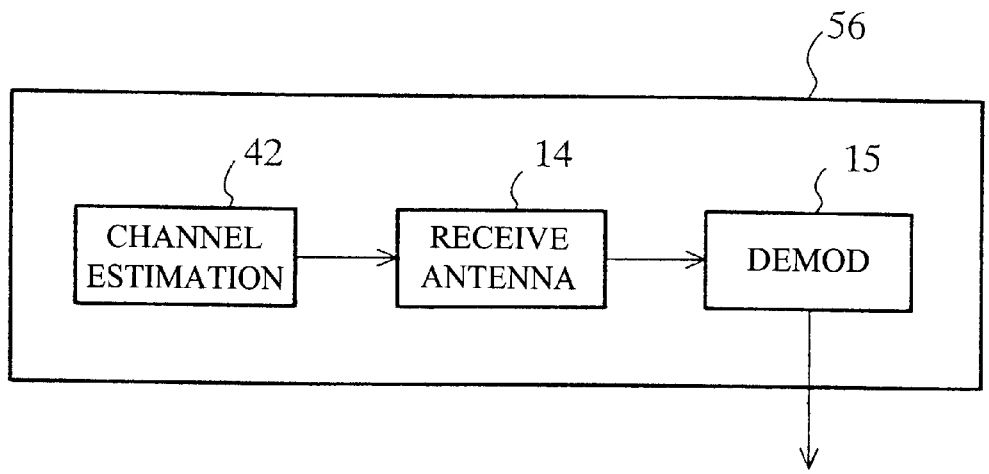
FIG. 41 is a diagram showing the block configuration of a modulation part of a modem according to Embodiment 15 of the present invention.

FIG. 41 is a diagram depicting the block configuration of a demodulation unit of a modem according to Embodiment 15 of the present invention. In the figure, reference numeral 42 denotes a channel estimation circuit identical in construction with that described above in Embodiment 14; reference numeral 14 denotes a receiving antenna 14 capable of changing its directivity based on the 3-D channel model provided from the channel estimation circuit 42; and reference numeral 15 denotes a demodulator that demodulates signals received from the receiving antenna 14 and outputs the demodulated signals as demodulated data. Reference numeral 56 denotes a demodulation part 56 composed of the channel estimation circuit 42, the receiving antenna 14 and the demodulator 15. Incidentally, the receiving antenna 14 and the demodulator 15 are identical with those described previously in connection with Embodiment 2.

The operation will now be described next.

Figure 42:
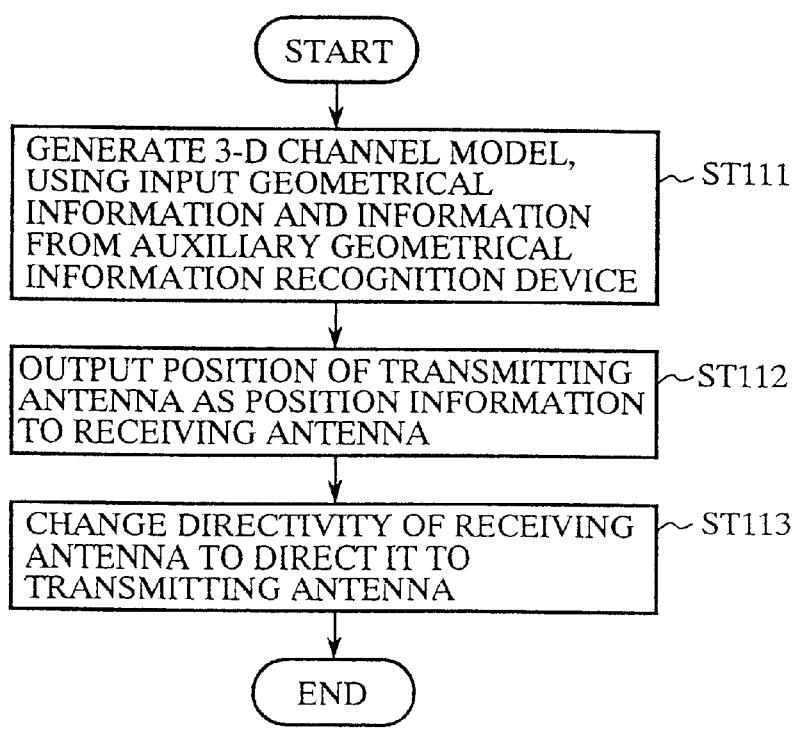
FIG. 42 is a flowchart showing the operation of the modulation part in Embodiment 15 of the present invention.

Here, FIG. 42 is a flowchart showing the operation of the demodulation unit 56 shown in FIG. 41. As is the case with Embodiment 1, the channel estimation circuit 42 makes a search in step ST111 for a transmitting antenna through recognition of the input geometrical information by pattern recognition technique, for example. In this step, if the locations of the transmitting antenna and nearby buildings are already known, such information as locations, heights, and shapes of the known objects are provided by auxiliary geometrical recognition device 27 that utilizes GPS, in the same manner as described in Embodiment 14. Then, the channel estimation circuit 42 obtains the location of the transmitting antenna from the 3-D channel model and provides it as the position information to the receiving antenna 14 in step ST112. In the next step ST113, the receiving antenna 14 changes its directivity so that it is directed to the transmitting antenna based on the position information.

As described above, according to Embodiment 15, the demodulation part 56 having the auxiliary geometrical information recognition device 27 excludes unnecessary object information in the given geometrical information from recognition, whereby this produces the effect of facilitating the recognition of the antenna being sought for and hence making the recognition process faster, in addition to the effect brought about by Embodiment 2 that permits high-quality communication by removing the multi-path components.

Further, in the above description, although there are shown that the channel estimation circuit 42 of Embodiment 14 has been applied to the demodulation part 51 according to Embodiment 2, if the channel estimation circuit 42 of Embodiment 14 is applied to the demodulation units 52–55 of Embodiments 3–9, the equalizer switch 61 of Embodiment 10, the transmission rate determination part 71 of Embodiment 11, the transmission part 81 of Embodiment 12, or the demodulation part 91 of Embodiment 13, it is possible to make it easier to recognize the desired antenna and hence produce the effect of speeding up the recognition process, in addition to the effects of the respective embodiments.

INDUSTRIAL APPLICABILITY

As described in detail above, the channel estimation circuit according to the present invention is suited for use in such components as a demodulation part, an equalizer switch, a transmission rate determination part, a transmission part, and a modulation part of a modem in mobile communication systems or satellite communication systems so as to estimate an optimal one of plural channels available or eliminate a frequency deviation due to Doppler shift at the time the communication channel is switched.

Further, the modem of the present invention is suitable for use in high-quality mobile communication systems and satellite communication systems in which plural channels are present between the transmitting and receiving sides due to reflections; in particular, the modem is suited for communications of higher quality by eliminating the influence of multi-path components when the channel undergoes a sharp change or when channel switching occurs during communication owing to movement of the radio terminal.

What is claimed is:

1. A channel estimation circuit for estimating an optimal one of plural channels available between radio terminals of transmitting and receiving stations that are in communication with each other, comprising:

a geometrical information input device for geometrically taking in information on ambient objects around said radio terminals;

geometrical information recognition device for searching said geometrical information from said geometrical information input device for an antenna of the distant station and for outputting position information of said antenna; and a model formulating device for formulating a channel model based on said geometrical information taken in by said geometrical information input device and said position information output from said geometrical information recognition device.

2. The channel estimation circuit according to claim 1, further comprising an auxiliary geometrical information recognition device which, when locations of ambient buildings and of the antenna of said distant station are known, recognizes the position of the radio terminal of the local station, then selects a processing region where to estimate a channel from the geometrical information taken in by the geometrical information input device based on the position of the radio terminal of said local station and information on said buildings and the antenna of the distant station, and outputs the selected processing region to the geometrical information recognition device.

3. A method for estimating an optimal one of a plurality of channels available between a transmit terminal and a receive terminal, the method comprising:

collecting geometrical information associated with one or more ambient objects around the transmit terminal and the receive terminal;

searching the collected geometrical information for information associated with an antenna of a distant one of the transmit terminal and the receive terminal; and formulating a channel model based on the collected geometrical information and position information associated with the information associated with the antenna.

4. The method according to claim 3 further comprising:

recognizing a position associated with a local one of the transmit terminal and the receive terminal when the position of the antenna and a position associated with the ambient objects is known;

selecting a processing region from the collected geometrical information based on the position of the local one of the transmit terminal and the receive the terminal and the position information associated with the ambient objects and the position of the antenna associated with the distant one of the transmit terminal and the receive terminal, the processing region associated with where a channel is to be estimated; and outputting the selected processing region.

* * * * *